United States Patent
Ladavac et al.

(10) Patent No.: US 11,954,802 B2
(45) Date of Patent: Apr. 9, 2024

(54) METHOD AND SYSTEM FOR GENERATING POLYGON MESHES APPROXIMATING SURFACES USING ITERATION FOR MESH VERTEX POSITIONS

(71) Applicant: Roblox Corporation, San Mateo, CA (US)

(72) Inventors: Alen Ladavac, Zagreb (HR); Morgan Samuel McGuire, Waterloo (CA)

(73) Assignee: Roblox Corporation, San Mateo, CA (US)

( * ) Notice: Subject to any disclaimer, the term of this patent is extended or adjusted under 35 U.S.C. 154(b) by 117 days.

(21) Appl. No.: 17/831,321

(22) Filed: Jun. 2, 2022

(65) Prior Publication Data

US 2023/0394764 A1    Dec. 7, 2023

(51) Int. Cl.
G06T 17/20    (2006.01)
G06T 7/13     (2017.01)

(52) U.S. Cl.
CPC .............. *G06T 17/20* (2013.01); *G06T 7/13* (2017.01)

(58) Field of Classification Search
None
See application file for complete search history.

(56) References Cited

U.S. PATENT DOCUMENTS

| | | |
|---|---|---|
| 4,710,876 A | 12/1987 | Cline et al. |
| 4,719,585 A | 1/1988 | Cline et al. |
| 4,729,098 A | 3/1988 | Cline et al. |
| 4,751,643 A | 6/1988 | Lorensen et al. |
| 2005/0134586 A1* | 6/2005 | Koo ........................ G06T 17/20 345/423 |
| 2005/0219245 A1* | 10/2005 | Tao ......................... G06T 17/20 345/424 |
| 2006/0290695 A1* | 12/2006 | Salomie .................. G06T 17/20 345/423 |

(Continued)

OTHER PUBLICATIONS

Akleman, Ergun et al., "Generalized Distance Functions", 1999 Shape Modeling International, Mar. 1, 1999, p. 72-79.

(Continued)

*Primary Examiner* — Sultana M Zalalee
(74) *Attorney, Agent, or Firm* — IP Spring

(57) ABSTRACT

Generating polygon meshes that approximate surfaces using iteration for mesh vertex positions. In some implementations, a method includes receiving input data that represents a surface distinguishing a volume, where a voxel grid includes the surface. Particular voxels of the voxel grid are identified, which the surface intersects. A surface-approximating mesh is generated including polygons defined by vertices in the particular voxels. Generating the mesh includes determining approximate positions of a subset of the vertices in a subset of the particular voxels, based on interpolation of locations in the voxel subset where the surface intersects the voxel subset. Errors between approximate voxel values (based on the approximate positions) and assigned voxel values of the particular voxels (based on the input data) are determined, and the approximate position of at least one vertex of the subset of the vertices is adjusted using a successive over-relaxation technique to reduce the errors.

20 Claims, 11 Drawing Sheets

(56) References Cited

U.S. PATENT DOCUMENTS

2021/0097703 A1* 4/2021 Chang .................. G06T 7/11
2021/0295597 A1* 9/2021 Higashikata ............ G06T 19/20

OTHER PUBLICATIONS

Blinn, James F. et al., "A Generalization of Algebraic Surface Drawing", ACM Transactions on Graphics 1:3, ACM, New York, NY, USA, Jul. 1982, p. 235-256.

Chica, A. et al., "Pressing: Smooth Isosurfaces with Flats from Binary Grids", Computer Graphics Forum. vol. 27. No. 1. Oxford, UK: Blackwell Publishing Ltd, Mar. 2008, 12 pages.

Gibson, Sarah F. Frisken, "Constrained Elastic SurfaceNets: Generating Smooth Models from Binary", TR99 24; Mitsubishi Electric Research Laboratories, Dec. 1999, 13 pages.

Glanznig, Michael et al., "Locally Adaptive Marching Cubes through Iso-Value Variation", Proceedings of the International Conference in Central Europe on Computer Graphics, Visualization and Computer Vision, Feb. 2009, 8 pages.

Hart, John C., "Ray Tracing Implicit Surfaces", SIGGRAPH'93 Course Notes: Design, Visualization and Animation of Implicit Surfaces, Aug. 1993, p. 1-16.

Hoffmann, Christoph et al., "Automatic Surface Generation in Computer Aided Design", The Visual Computer, 1.2, Aug. 1985, p. 92-100.

Ju, Tao et al., "Dual contouring of hermite data", Proceedings of the 29th annual conference on Computer graphics and interactive techniques, ACM Transactions on Graphics, vol. 21, Issue 3, Jul. 2002, 8 pages.

Keinert, Benjamin et al., "Enhanced Sphere Tracing", Proceedings of Smart Tools & Apps for Graphics, Andrea Giachetti (ed.), EuroGraphics, Sep. 2014, pp. 1-8.

Labelle, Francois et al., "Isosurface Stuffing: Fast Tetrahedral Meshes with Good Dihedral Angles", ACM SIGGRAPH 2007 papers, ACM Transactions on Graphics, 26(3), Jul. 2007, 10 pages.

Lorensen, William E. et al., "Marching cubes: A high resolution 3D surface construction algorithm", ACM SIGGRAPH Computer Graphicsvol. 21; Issue 4; https://doi.org/10.1145/37402.37422, Jul. 1987, pp. 163-169.

Osher, Stanley et al., "Level Set Methods: An Overview and Some Recent Results", Journal of Computational Physics, vol. 169, Issue 2, Sep. 5, 2000, pp. 463-502.

Shu, Renben et al., "Adaptive Marching Cubes", The Visual Computer 11.4, 2003, 29 pages.

Bronshtein, et al., "Handbook of Mathematics—Chapter 19—Numerical Analysis", Handbook of Mathematics, 5th Edition, Jan. 1, 2007, pp. 884-952.

EPO, Extended European Search Report for European Patent Application No. 23175625.5, Oct. 13, 2023, 17 pages.

Kim, et al., "A new finite element approach for solving three-dimensional problems using trimmed hexahedral elements", International Journal of Numerical Methods in Engineering, vol. 102, No. 9, Mar. 17, 2015, 27 pages.

Kobbelt, et al., "Feature Sensitive Mesh Processing", Proceedings of the 18th Spring Conference on Computer Graphics, SCCG '03, Apr. 24, 2003, pp. 17-22.

Kretschmer, et al., "Reliable Adaptive Modelling of Vascular Structures with Non-Circular Cross-Sections", Computer Graphics Forum: Journal of the European Association for Computer Graphics, vol. 31, Jun. 25, 2012, 10 pages.

Press, et al., "Chapter 9: Root Finding and Nonlinear Sets of Equations", Numerical Recipes in C: the Art of Scientific Computing, Feb. 1993, 48 pages.

Shu, et al., "Adaptive marching cubes", Visual Computer, vol. 11, No. 4, Jan. 1995, 16 pages.

\* cited by examiner

METHOD AND SYSTEM FOR GENERATING POLYGON MESHES APPROXIMATING SURFACES USING ITERATION FOR MESH VERTEX POSITIONS

TECHNICAL FIELD

This disclosure relates to the field of computer-generated surface approximation and, in particular, to methods, systems, and computer readable media for generation of polygon meshes that are approximations of surfaces.

BACKGROUND

Rendering of three-dimensional (3D) objects and surfaces for display on display devices is used in a wide array of applications. Images, videos, games, simulations, virtual reality systems, medical imaging, and many other applications render 3D objects and surfaces for display on two-dimensional (2D) screens and/or in 3D virtual environments based on data that describes the objects and surfaces. Various techniques have been developed to allow devices to efficiently generate, store, and display an approximation of a surface as a mesh of polygons, such as triangles, based on input data describing the surface.

In many systems, surface data is received in any of various formats. For example, surface data may be encoded as a mathematical function, a grid of voxels containing scalar values, a point set, or other representation. However, standard techniques for approximating a mesh from surface data may not provide an accurate approximation of the surface, e.g., when the surface data is provided in particular formats, or in other cases, has particular characteristics. For example, in some applications, data to be rendered is not provided as a distance function but may include density or occupancy values that indicate an amount of each voxel that is occupied by a volume having the surface. In other examples, a surface may vary non-linearly along edges of voxels. In such cases, renderings by existing techniques for approximating meshes for surfaces may be inaccurate. Accordingly, there may exist a need for improved techniques that can efficiently generate meshes that approximate surfaces more accurately.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to generating polygon meshes that approximate surfaces using iteration for mesh vertex positions. In some implementations, a method includes receiving, by one or more processors, input data that represents a surface that distinguishes an inside and an outside of a volume. A voxel grid that includes the surface is determined by the one or more processors, the voxel grid including a plurality of voxels. Particular voxels of the voxel grid are identified by the one or more processors, which the surface intersects. A mesh is generated by the one or more processors that approximates the surface, the mesh including polygons that are defined by vertices in the particular voxels. Generating the mesh includes determining approximate positions of a subset of the vertices of the polygons of the mesh in a subset of the particular voxels, based on interpolation of locations in the subset of the particular voxels where the surface intersects the subset of the particular voxels; determining errors between approximate voxel values and assigned voxel values of the particular voxels, wherein the approximate voxel values are based on the approximate positions and the assigned voxel values are determined from the input data; and adjusting the approximate position of at least one vertex of the subset of the vertices using a successive over-relaxation technique to reduce the errors.

Various implementations and examples of the method are described. For example, in some implementations, adjusting the approximate position of the at least one vertex includes iterating, using the one or more processors, the determining the errors and the adjusting until the errors meet predetermined criteria. In some implementations, the errors meet predetermined criteria in response to a predetermined number of iterations being performed or in response to the errors meeting one or more predetermined thresholds. In some implementations, the approximate positions of the subset of the vertices of the polygons are determined based on interpolation of locations on edges of the subset of the particular voxels where the surface intersects the edges.

In some implementations, the method further includes mapping, by the one or more processors, each voxel of the plurality of voxels to a respective intersection case from a set of stored intersection cases based on the input data, wherein each mapped intersection case indicates an intersection path of the surface through the voxel, and identifying the particular voxels includes identifying edges or other line segments of the particular voxels which the surface intersects based on the mapped intersection cases. In some implementations, determining the approximate positions of the subset of the vertices of the polygons of the mesh includes determining initial approximate positions of the vertices using a marching cubes technique or a surface nets technique.

In some implementations, the successive over-relaxation technique is used to determine a plurality of approximate positions of the subset of vertices of the polygons, and the subset of the particular voxels includes a plurality of adjacent voxels of the mesh. In some implementations, the subset of the particular voxels include a plurality of adjacent voxels of the voxel grid, and the method further includes determining approximate positions of a second subset of vertices of the polygons of the mesh in a second subset of adjacent voxels of the particular voxels.

In some implementations, determining the errors includes determining the approximate voxel values based on the approximate positions and comparing the approximate voxel values with the assigned voxel values, wherein determining the approximate voxel values includes, for each approximate voxel value, determining a volume of the mesh that intersects the voxel associated with the approximate voxel value and determining the approximate voxel value based on the volume of the mesh. In some implementations, determining the volume of the mesh that intersects the voxel associated with the approximate voxel value includes determining a 3-dimensional integral of the mesh within the voxel associated with the approximated voxel value.

In some implementations, the method further includes generating a feature surface based on the mesh, the feature surface displayable by a display device. In some implementations, each vertex is constrained to dimensions of a voxel space of an associated voxel of the particular voxels. In some implementations, the input data includes scalar values that indicate a density or occupancy of voxels by the volume.

In some implementations, a system includes at least one processor and a memory coupled to the at least one processor, with instructions stored thereon that, when executed by the at least one processor, cause the at least one processor to perform operations. The operations include receiving input data that represents a surface that distinguishes an inside and an outside of a volume; determining a voxel grid that includes the surface, wherein the voxel grid includes a plurality of voxels; identifying particular voxels of the voxel grid which the surface intersects; and generating a mesh that approximates the surface, the mesh including a plurality of polygons that are defined by vertices of the mesh in the particular voxels. Generating the mesh includes determining approximate positions of a subset of the vertices of the polygons of the mesh in a subset of the particular voxels, based on interpolation of locations in the subset of the particular voxels where the surface intersects the subset of the particular voxels; determining errors between approximate voxel values and assigned voxel values of the particular voxels, wherein the approximate voxel values are based on the approximate positions and the assigned voxel values are determined from the input data; and adjusting the approximate position of at least one vertex of the subset of the vertices using a successive over-relaxation technique to reduce the errors.

Various implementations and examples of the system are described. For example, in some implementations, the operation of adjusting the approximate position of the at least one vertex includes iterating the determining the errors and the adjusting until the errors meet predetermined criteria. In some implementations, the successive over-relaxation technique is used to determine a plurality of approximate positions of the subset of vertices of the polygons, and the subset of the particular voxels includes a plurality of adjacent voxels of the mesh. In some implementations, the subset of the particular voxels include a plurality of adjacent voxels of the voxel grid, and the at least one processor performs further operations including determining approximate positions of a second subset of vertices of the polygons of the mesh in a second subset of adjacent voxels of the particular voxels.

In some implementations, the operation of determining the errors includes determining the approximate voxel values based on the approximate positions and comparing the approximate voxel values with the assigned voxel values, wherein determining the approximate voxel values includes, for each approximate voxel value, determining a volume of the mesh that intersects the voxel associated with the approximate voxel value and determining the approximate voxel value based on the volume of the mesh. In some implementations, the operation of determining the volume of the mesh that intersects the voxel associated with the approximate voxel value includes determining a 3-dimensional integral of the mesh within the voxel associated with the approximated voxel value. In some implementations, each vertex is constrained to dimensions of a voxel space of an associated voxel of the particular voxels. In some implementations, the at least one processor performs further operations including generating a feature surface based on the mesh, the feature surface displayable by a display device.

In some implementations, a non-transitory computer readable medium has stored thereon software instructions that, when executed by a processor of a device, cause the processor to perform operations. The operations include receiving input data that represents a surface that distinguishes an inside and an outside of a volume; determining a voxel grid that includes the surface, wherein the voxel grid includes a plurality of voxels; identifying particular voxels of the voxel grid which the surface intersects; and generating a mesh that approximates the surface, the mesh including a plurality of polygons that are defined by vertices of the mesh in the particular voxels. Generating the mesh includes determining approximate positions of a subset of the vertices of the polygons of the mesh in a subset of the particular voxels, based on interpolation of locations in the subset of the particular voxels where the surface intersects the subset of the particular voxels; determining errors between approximate voxel values and assigned voxel values of the particular voxels, wherein the approximate voxel values are based on the approximate positions and the assigned voxel values are determined from the input data; and adjusting the approximate position of at least one vertex of the subset of the vertices using a successive over-relaxation technique to reduce the errors.

DETAILED DESCRIPTION

Figure 1A:
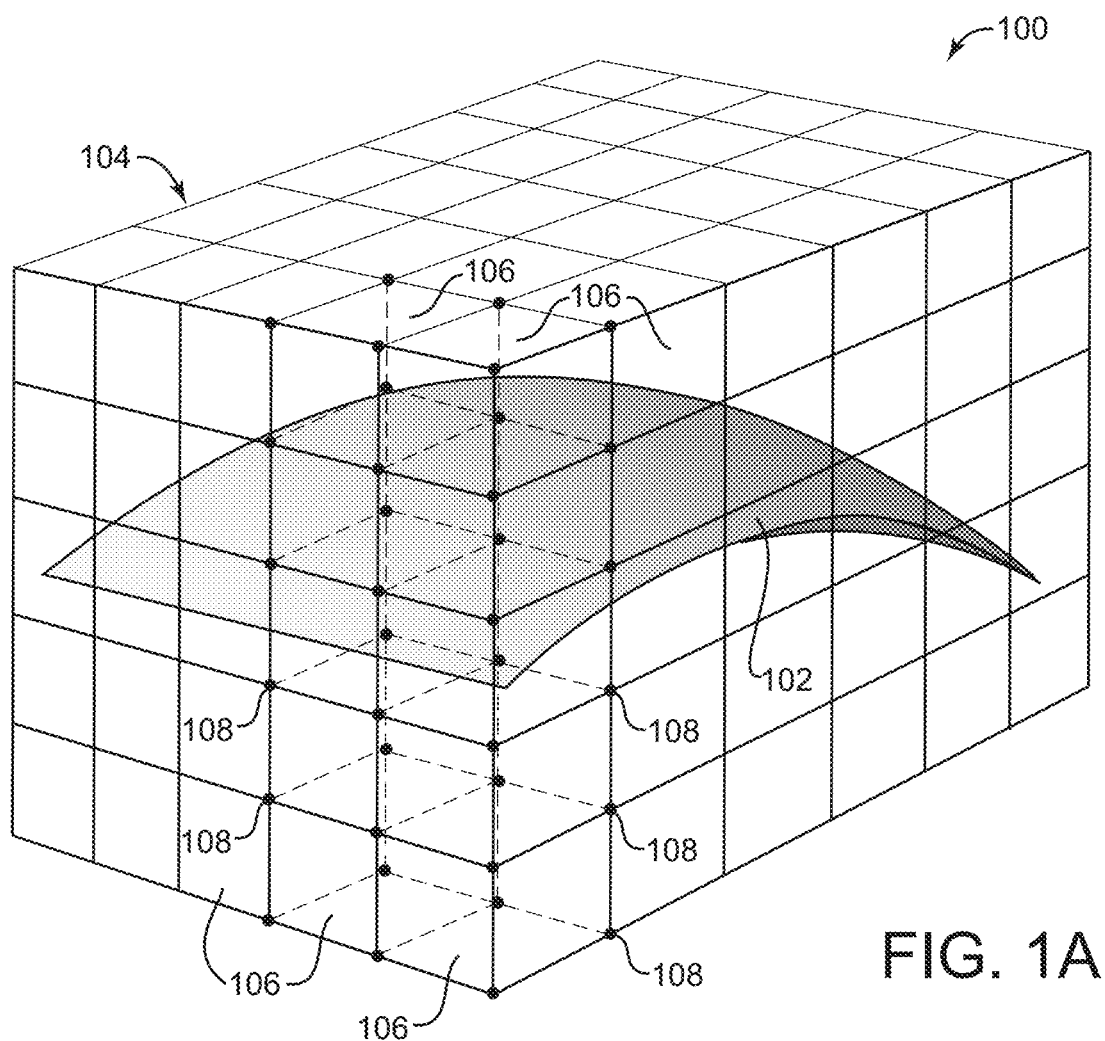
FIG. 1A is a diagrammatic illustration of a surface over which a voxel grid is imposed

One or more implementations described herein relate to generating polygon meshes that approximate surfaces represented in input data. Described features include using one or more root-finding techniques and/or iteration to determine vertices of polygons that make up a mesh.

In some example applications, input data is received that represents surfaces or features having such surfaces (e.g., objects, terrain features, etc.). The input data may be provided or transmitted from, for example, a terrain editing program, constructive solid geometry application, three-dimensional (3D) modeling program, magnetic resonance imaging (MM), X-ray or other volumetric scanner, image capture device, virtue reality (VR) or augmented reality (AR) program or device, or other source. In some cases, a mesh of polygons is to be generated which approximates the surfaces or objects. The mesh can be defined with sufficiently reduced complexity such that it can be processed, transmitted, and/or rendered for display quickly and stored in reduced storage space compared to other representations of surfaces and objects. For example, such a mesh is commonly used in applications such as efficient rendering of terrains, medical images, or objects modeled in a clay-like manner.

Input data can be encoded in a variety of forms and formats, e.g., as a mathematical function, a grid of discrete voxels containing the scalar values, a point set, or any other representation suitable for mapping 3D locations to values. In some examples, the input data can define a 3D field $f(x, y, z)$ that associates with every $(x, y, z)$ location a scalar value. Depending on the application, this field's scalar values can represent distance from some desired surface, creating a "signed distance field". In other applications, the scalar values can represent density or occupancy, creating an "occupancy field," or can represent an arbitrary continuous but non-distance value. Occupancy is herein referred to as ratio of occupied volume (e.g., occupied by solid material) within one voxel, and is not a continuous field in three dimensions because it cannot evaluated at any arbitrary location in space. The occupancy values are known in discreet voxels because those occupancy values in voxels are integrals of the infinitesimal occupancy across each voxel. Mesh generating techniques can be applied to occupancy fields as if they were distance functions, but this may limit the quality of their results.

An isosurface (e.g., level set) (referred to as a "surface" herein) is a surface for which the field has a constant value. Typically, an isosurface threshold f is used, where f=0 (for distance and arbitrary data) and f=0.5 (for occupancy data) are the most interesting isosurfaces to identify. The surface is a continuous, potentially smooth shape in 3D space. The surface distinguishes the inside and outside of a volume.

In some cases, the input data is encoded in voxels, and an interpolation technique the produced the voxels can define the field. In some examples, the field can be interpolated via tri-linear interpolation, nearest neighbor (e.g., point sampling), or higher-order methods. Tri-linear interpolation produces cubic (third order) variation along a line, which means that the field varies nonlinearly. Arbitrary forms of input data can be 3D rasterized into voxels as a preprocessing step.

The described techniques determine and generate a polygonal mesh (e.g., triangular mesh or a mesh made of different types of polygons) that approximates a surface defined in the input data. In some cases, a line mesh can be determined and generated for a two-dimensional (2D) field defined in the input data. The techniques described herein can convert input data expressed in various forms into a mesh that allows efficient physics simulation, rendering, and storage, as well as further editing.

One or more techniques described herein can achieve higher quality than previous techniques, even in cases where the input data includes discrete occupancy values. Described techniques can also be applied to the true distance field as inferred from an occupancy field.

For example, the known mesh generation technique of "marching cubes" (including the related methods of marching tetrahedra and their 2D equivalents of marching squares and marching triangles) imposes a voxel grid and classifies each vertex of the mesh as inside or outside of the volume (which, for example, can be one bit per vertex/corner of the voxel cage). A template of triangles is generated, which identifies the edges through which the surface passes but not the location along those edges. The marching cubes algorithm uses linear interpolation to estimate a location where the actual surface intersects the voxels based on the values of the signed distance function at the voxel corners. In some cases, e.g., if the field $f$ is a linear gradient, then linear interpolation along an edge of the position (x, y, z) proportional to the values of $f$ will exactly identify the actual surface's intersection location. However, where $f$ varies nonlinearly along the edge, this places the vertices of the generated mesh at positions that are off the actual surface, creating an inaccurate mesh representation of the surface.

An extension of marching cubes uses quadratic interpolation to better match a nonlinear density function of human bone and tissue in computer tomography and X-ray scans when finding the surface. However, another limitation of the marching cubes technique is that it only makes a good approximation when it is applied to true, metric distance functions. When the input $f$ is either non-metric (e.g., is monotonic in distance to the surface but not directly proportional) or contains occupancy/density information instead of distances, marching cubes produces inconsistent slopes for the generated triangles as well as determines vertex positions that are off the surface.

A related technique known as "surface nets" is designed to work more robustly on non-distance functions. It places mesh vertices at the centers of voxels that are on the boundary, connects adjacent vertices, and then relaxes the total surface for smoothness while constraining the vertices to not leave the cages of their original voxels.

Some extensions of the surface nets technique place one vertex in each corner between eight voxels, where at least one voxel is below the threshold and at least one voxel is above the threshold surface. Then the vertex is moved to the position calculated by interpolating between those voxel centers based on their values. One approach is to use the same linear interpolation as in the marching cubes technique to interpolate between each pair of voxels, where one voxel is above and the other is below the threshold, and then average the positions. However, the surface nets technique uses data from values of the function outside each cell and thus is not local and is not parallelizable. This is not memory efficient on a digital processor, since it makes use of data dependencies that require communication between separate processor threads handling different voxel cells.

There are several advantages to techniques and features described herein. The present disclosure details techniques that can be used to generate a mesh of polygons approximating a surface. The described techniques are independent and can be used in isolation, or in any combination. Each technique improves the accuracy of surface finding and generation in cases where previous techniques, such as marching cubes, generate poor results due to the field varying nonlinearly along edges or the field not being described by a distance function. Features are described with reference to a 3D cube case, but the same features can be applied to 3D tetrahedra, 2D squares, and 2D triangles.

Unlike surface nets and other machine learning methods, the described techniques provide efficiency as they are local and perfectly parallelizable. Thus, only data from values of the function near each cell are used. This is memory efficient on a digital processor and ensures that there are no data dependencies that require communication between separate processor threads handling different voxels. It is also the case that the results of using these techniques are deterministic, which avoids cracks or discontinuities in the generated surface between voxels. For example, per the described techniques, mesh vertices can be independently computed for two adjacent voxels along their faces of the generated surface, such that the techniques independently yield identical vertex values. This provides a mesh that more accurately approximates a surface without increasing processing requirements to address discontinuities between voxels.

A technical effect of one or more described implementations is that devices expend fewer computational resources to obtain results that can be more accurate. For example, a technical effect of described techniques is a reduction in the consumption of system processing resources and power resources as compared to prior systems that do not provide one or more of the described techniques or features. For example, a prior system using a prior technique such as surface nets may require more memory storage due to data dependencies that require communication between separate processor threads handling different voxels. Techniques described herein can be implemented locally to a processor or processor thread, and do not require such communication. A prior system or technique that does not provide deterministic results may be required to perform additional processing to smooth out or otherwise address discontinuities arising between voxels that are independently processed. Techniques described herein provide deterministic results to provide greater accuracy and avoid such additional processing. Some prior systems generate results that are inaccurate due to the surface varying nonlinearly along voxel edges or due to the surface not being described by a distance function. Techniques described herein can provide meshes that more accurately approximate surfaces that may vary nonlinearly or are not described by a distance function (e.g., described by occupancy values or density values).

Example Voxel Grid and Surface

FIG. 1A is a diagrammatic illustration 100 of an example surface 102 described in input data, in accordance with some implementations. Surface 102 can be a feature like terrain or landscape, a portion of a virtual object, etc. A voxel grid 104 is imposed over surface 102. In this example, voxel grid 104 is composed of a plurality of cubical voxels 106 that all have the same dimensions. A subset of voxels 106 are detailed for visual simplicity. Voxels 106 include vertices 108, which in this example are corners of the voxels. Surface 102 has an intersection path through voxels 106 of voxel grid 104, e.g., surface 102 intersects the faces and edges of some of the voxels 106 of the grid. Herein, a "face" of a voxel is referred to as a 2-dimensional side of a voxel, and an "edge" of a voxel is referred to as a one-dimensional side of a face. A "line segment" can be an edge of a voxel or can be another type of line portion on or in a voxel, e.g., a line defined from a vertex of the voxel, such as a line that connects two center vertices or other vertices of adjacent voxels as used in some surface nets techniques, etc.).

Figure 1B:
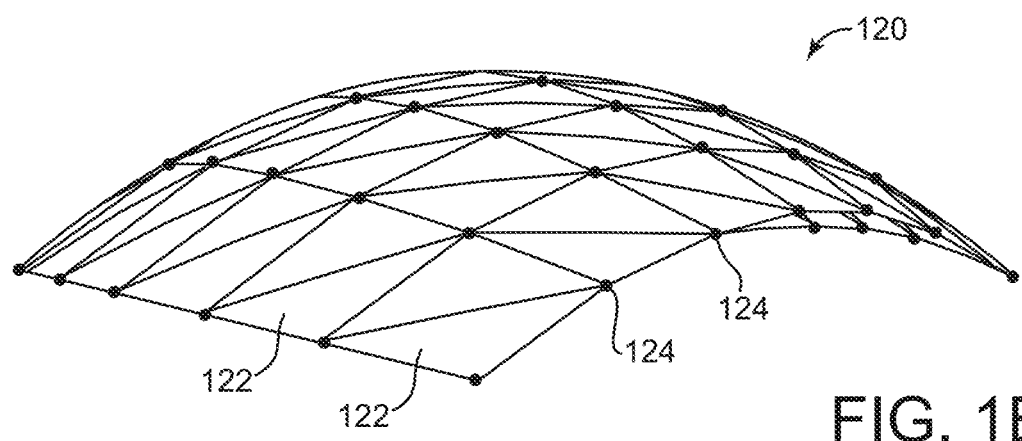
FIG. 1B is a diagrammatic illustration of an example mesh that approximates the surface of FIG. 1A, in accordance with some implementations.

FIG. 1B is a diagrammatic illustration of an example mesh 120 that approximates the surface 102 shown in FIG. 1A, in accordance with some implementations. Mesh 120 is composed of polygons that in this example are triangles 122 defined by mesh vertices 124. Triangles 122 are oriented to approximate the contours of surface 102. Mesh 102 is generated by finding positions of the mesh vertices 124 within the voxels 106 of voxel grid 106 shown in FIG. 1A. The positions of the mesh vertices 124 are determined within the set of voxels intersected by the surface 102. The positions of the mesh vertices 124 relative to the voxels 106 can be determined using one or more techniques described herein, which can generate meshes similar to mesh 102 and/or other meshes, e.g., meshes made of different numbers and/or types of polygons (e.g., quads, additional triangles, etc.).

Mesh Generation Method

Figure 2:
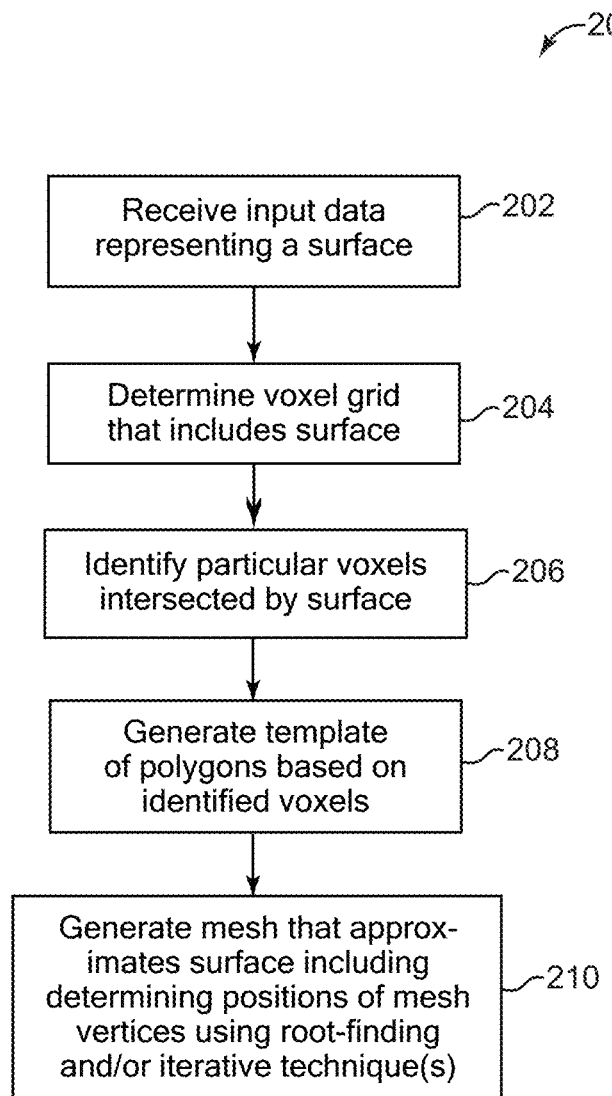
FIG. 2 is a flow diagram of an example method of generating a polygon mesh approximating a surface represented in input data, in accordance with some implementations.
Figure 12:
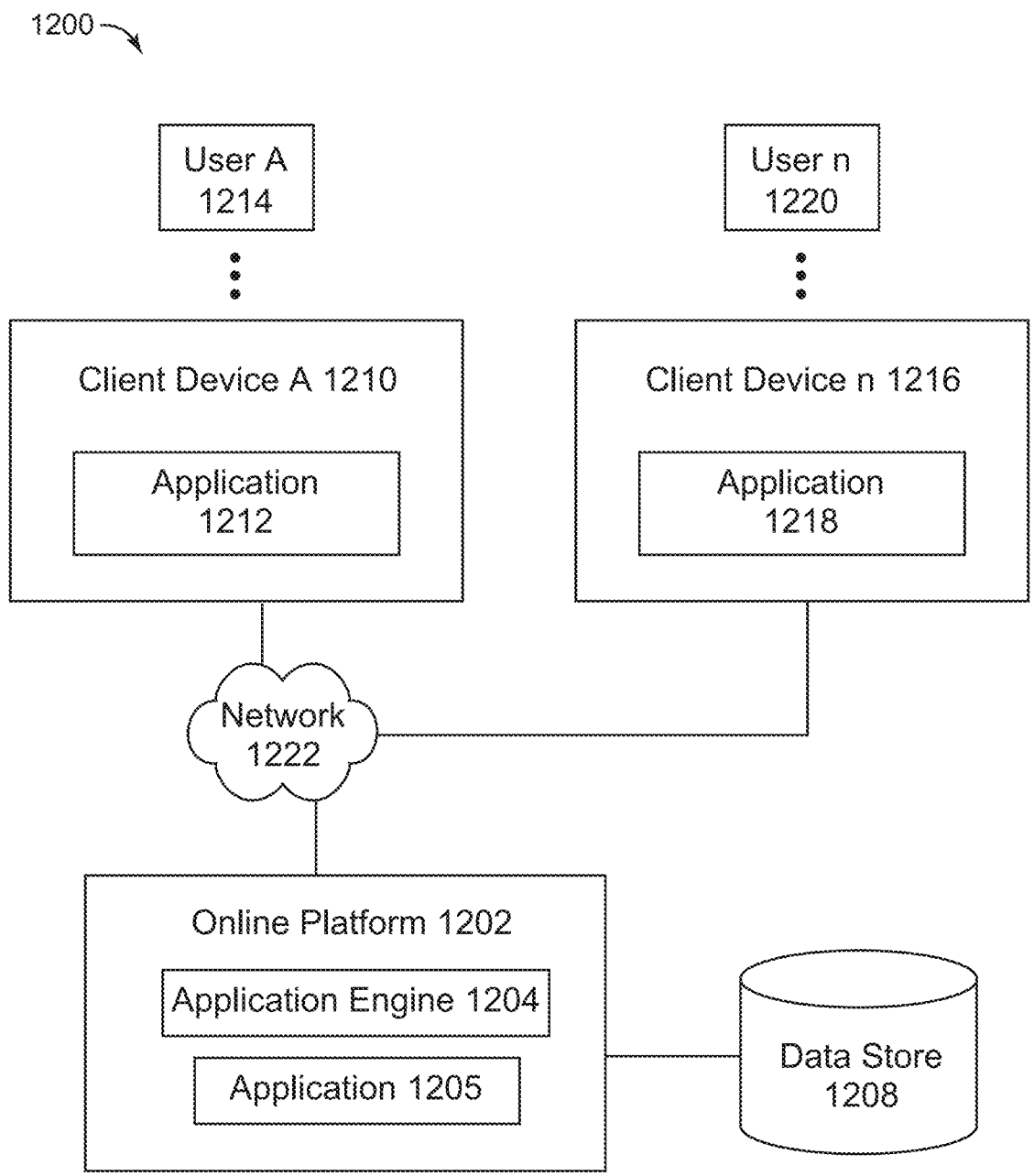
FIG. 12 is a block diagram illustrating an example system which may be used to implement one or more features described herein, in accordance with some implementations.
Figure 13:
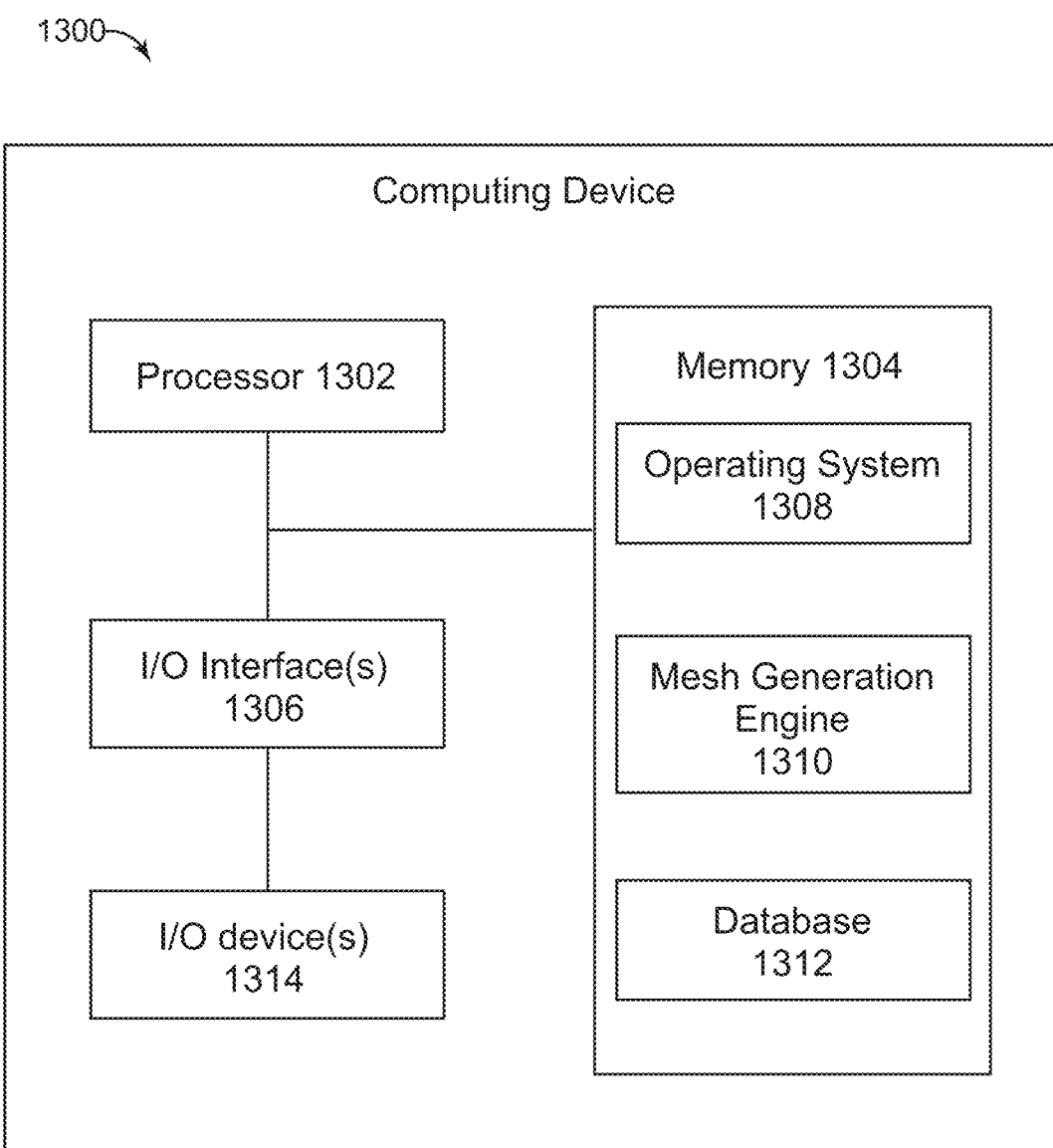
FIG. 13 is a block diagram illustrating an example computing device which may be used to implement one or more features described herein, in accordance with some implementations.

FIG. 2 is a flow diagram of an example method 200 of generating a polygon mesh approximating a surface represented in input data, in accordance with some implementations. In some implementations, method 200 can be performed, for example, on a server system, e.g., online platform 1202 as shown in FIG. 12 or computing device 1300 as shown in FIG. 13. In some implementations, some or all of the method 200 can be implemented on a system such as one or more client devices 1210 and 1216 as shown in FIGS. 12 and/or 13, and/or on both a server system and one or more client systems. In described examples, the implementing system includes one or more processors or processing circuitry, and one or more storage devices such as a database or other accessible storage. In some implementations, different components of one or more servers and/or client devices can perform different blocks or other parts of the method 200.

Method 200 may begin at block 202. In block 202, input data is received by a device or system that performs method 200. In some implementations, the input data includes a representation of one or more surfaces (e.g., isosurfaces) within a 3D field. The surface can be a continuous, potentially smooth shape in 3D. For example, the surface can be a surface of a 3D object represented in a video game, virtual reality environment, or other virtual environment. In some examples, the surface can be a representation of a surface of a physical object or other feature in a scanned or sensed volume or area, such as an organ in a human body, an object in a particular environment (e.g., within a material or element, underground, in outer space, underwater, etc.), a geographical landscape, or other environment.

In some implementations, the surface distinguishes an inside and an outside of a volume. For example, a represented object can have a volume, where the inside of the volume includes one or more materials of the object, and the outside of the volume is the environment in which the object is located. In some examples, the surface can define where an interior of an object is located (e.g., the walls indicating an interior volume of a car object) and where an exterior to the object is located (e.g., the walls and other outer surfaces indicating space around the car, the surface on which it is located, etc.).

In some implementations or cases, the input data describes a 3D field that has a scalar value at each (x, y, z) location of the field. In some implementations or cases, each scalar value can represent a distance from the surface, thus forming a signed distance field (e.g., positive or negative outside or above the surface, and the opposite sign (negative or positive) inside or below the surface). In some implementations or cases, each scalar value can represent a ratio of voxel volume occupied by the volume (e.g., solid material of the volume) defined by the surface, thus representing an amount of density or occupancy of the voxel, and forming an occupancy field. In some implementations, this occupancy is not a continuous field in 3D because it cannot be evaluated at any arbitrary location in space; the occupancy value may be known only in discrete voxels. The occupancy values in voxels can be integrals of the infinitesimal occupancy across each voxel. In some implementations or cases, each scalar value can represent a continuous and non-distance value, or other value.

In some implementations, the surface is an isosurface (e.g., level set), which is the surface for which the field has a constant value. In some implementations, an isosurface threshold can be used. In some examples, a threshold of 0 (for distance and arbitrary data) and 0.5 (for occupancy data) can be used for identifying isosurfaces.

In various examples, the input data can be encoded as a mathematical function, a grid of discrete voxels containing the scalar values, a point set, or any other representation, e.g., representations suitable for mapping 2D or 3D locations on the surface to values. In some examples, if the input data is encoded in voxels, the interpolation method used to encode the voxels defines a surface field. The surface field may be interpolated using any of various techniques, e.g., tri-linear interpolation, nearest neighbor (e.g., point sampling), or higher-order methods. Tri-linear interpolation may produce cubic (third order) variation along a line, such that the surface field varies nonlinearly. In further examples, arbitrary forms of input data are 3D rasterized into voxels as a preprocessing step prior to method 200. In some implementations, if the input data is encoded in a voxel grid, the voxel grid used for method 200 (and any of the other methods described herein) can be a different grid than the grid of the input data (e.g., a grid having a different resolution or voxel dimensions). In some implementations, the voxel grid of the input data, or its dual (e.g., with values considered to be at voxel corners instead of centers), can also be used for methods described herein.

In various examples, the input data may be provided by an application program, device, or other source. For example, a terrain editing program, constructive solid geometry application, 3D modeling program, MM, X-ray or other volumetric scanner can produce input data received at block 202. In some implementations, data output by such a source is preprocessed before being received at block 202, e.g., encoded in one of the representations described above (e.g., mathematical function, voxels, etc.).

In some implementations, a 2D equivalent of the surface can be represented in the input data, such as a line (e.g., an isoline or contour lines). The represented line, instead of a surface, can be approximated using similar techniques to those described herein including method 200. For example, the line can be approximated by being provided multiple different straight segments (e.g., a polyline) and/or approximated curvatures. Block 202 may be followed by block 204.

In block 204, a voxel grid is determined that includes the surface represented in the input data, where the voxel grid includes a plurality of voxels. In some implementations, the voxels can be cubical in shape. For example, a voxel grid can be imposed on the input data and then each corner of each voxel can be classified as inside or outside of the volume defined by the surface in the input data. In some examples, one bit can be assigned for each corner of each voxel of the voxel grid. The size of the voxels in the grid can be determined based on a desired resolution, available storage, and/or other considerations.

In some implementations, the input data received in block 202 may have voxels and a voxel grid that was previously encoded in the input data, and these same voxels can be used in method 200 such that block 204 does not define any different voxels on the input data and surface. In some implementations, a similar grid to such an existing voxel grid can be determined in block 204, e.g., a dual of the existing grid where voxel values are considered to be at voxel corners instead of voxel centers. In some implementations, a new voxel grid defining new voxels can be determined in block 204 for the input data that can be different than an existing encoded voxel grid, where the new voxels are used in method 200. Block 204 may be followed by block 206.

In block 206, particular voxels are identified which the surface intersects. For example, this can include identifying line segments, e.g., edges, of particular voxels through which the surface passes (e.g., an intersection path of the surface). In some implementations, this is performed by mapping one or more voxels of the voxel grid to respective intersection cases from a set of stored intersection cases. For example, each voxel of the voxel grid can be assigned to an associated intersection case. In some implementations, the intersection cases from a marching tetrahedra or marching cubes technique can be used, or intersections used in a different technique can be used (e.g., intersections of line segments in some surface nets or other techniques). In some implementations, a number of unique intersection cases can be provided (e.g., stored and accessed in a lookup table of the system), each intersection case describing a different path of the surface (or the volume) through a voxel, e.g., indicating a different set of voxel edges (or other voxel line segments) that are intersected by the surface (or the volume). The intersection cases can based on different rotations and/or reflections of possible pathways of a surface through a voxel. For example, in the marching cubes technique, a set of 14 unique intersection cases describes all the possible edge intersections of a surface passing through the twelve edges of a voxel. In some implementations, a set of eight bits can be associated with the eight collective corners of each voxel, and each different set of bits maps to a different one of the intersection cases. For example, the set of bits can be a vector that acts as an index to a table of intersection cases.

In some examples, for a trivial case in which a voxel is fully outside the volume and no surface intersects that voxel, the voxel may be assigned an intersection case labelled by all zero values for the set of bits. In another example, for another trivial case in which a voxel is fully inside the volume and no surface intersects that voxel, the voxel may be assigned an intersection case labelled by all one values for the set of bits. In other intersection cases, the surface passes through one or more faces of the voxel and an appropriate intersection case is assigned to the voxel based on the corners of the voxel that are inside the volume and the corners that are outside the volume. In another example, a marching tetrahedra technique can be used. This technique is similar to marching cubes, except that each voxel cube is divided into six tetrahedra, and instead of twelve edges of the voxel, nineteen edges are designated. Eight intersection cases are possible for each tetrahedron. Other implementations can assign intersection cases or labels/bits in other ways. Other techniques can alternatively or additionally be used to determine voxel line segments intersected by the surface. Block 206 may be followed by block 208.

In block 208, a template of polygons is generated based on the identified particular voxels. For example, the template can be generated based on identified line segments (e.g., edges) of the identified particular voxels. For example, in some implementations, the polygons can be triangles; in other implementations, the polygons can be of other types (tetrahedron, etc.). The template identifies the edges (or other line segments) that the surface intersects and not particular positions along those edges. In some implementations, vertices of the polygons of the template can be assigned initial positions along the identified edges of the particular voxels. For example, the initial positions can be the corners or the midpoints of the identified edges. Other initial positions can be used in other implementations (e.g., a particular fraction of the edge distance, etc.). Block 208 may be followed by block 210.

In block 210, a mesh is generated based on the template of block 208, where the mesh approximates the surface. For example, the mesh can be a polygon mesh for a 3D field and surface, or a line mesh for a 2D field and line. The mesh generation includes determining positions of vertices of the polygons of the mesh using one or more root-finding techniques and/or iterative techniques, according to features described herein. This block estimates the locations at which the surface lies based on the values in the input data, which can be values of a signed distance function that describes the surface at vertices (e.g., corners) of the intersected voxels, or can be occupancy values or density values. Using described techniques, the positions of the mesh vertices are determined with more accuracy than previous techniques. Various implementations for determining the positions of the vertices for block 210 are described below with reference to FIGS. 3-11.

The mesh resulting from block 210 can be used as an approximation of the surface represented in the input data. After the positions of the vertices are determined using one or more described techniques, the mesh is defined and can be finalized. In some implementations, the mesh can be additionally processed in various ways, e.g., be assigned characteristics (e.g., colors or textures to fill its polygons), modified to fit a particular object, stored in particular storage, displayed by a display device, etc. The generation of the mesh provides conversion of field input data expressed in various forms into a polygonal mesh that can be used for, e.g., efficient physics simulation, rendering, storage, and/or further editing of the data. Common applications include efficient rendering of terrains, medical images, or objects modeled in a clay-like manner. For example, the mesh can be used in the generation of a feature surface of a feature, such as the surface of a terrain feature (landscape, mountains, etc.), organ or other body part, digital object, etc.

Selection of Method for Determination of Mesh

Figure 3:
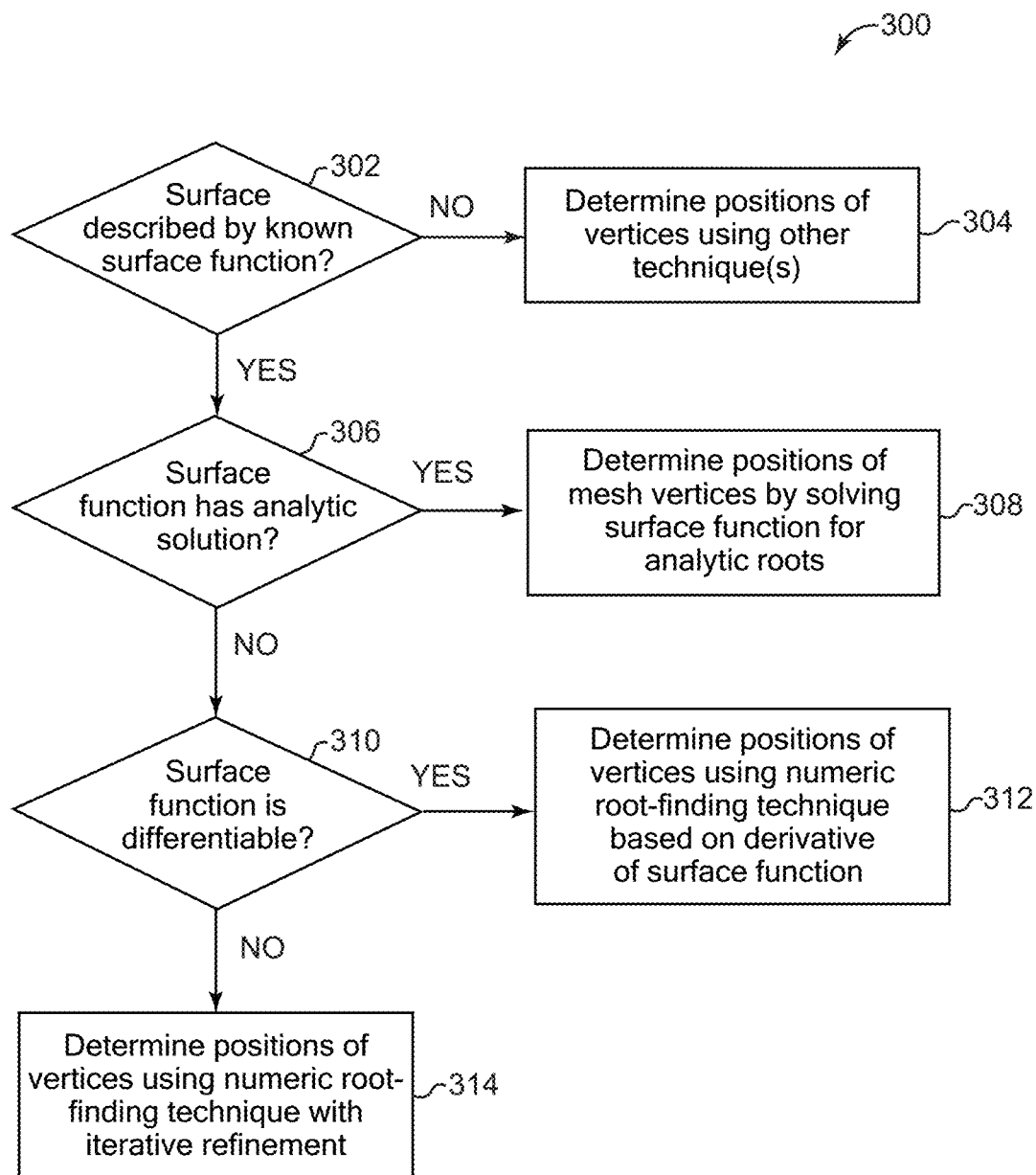
FIG. 3 is a flow diagram of an example method of determining the positions of vertices of a mesh that approximates a surface, in accordance with some implementations.

FIG. 3 is a flow diagram of an example method 300 of determining the positions of vertices of a mesh that approximates a surface, in accordance with some implementations.

For example, method 300 can be an example implementation of determining vertex positions in block 210 of method 200 of FIG. 2 described above. In some implementations, method 300 can be performed, for example, on a server system and/or client system similarly as described for method 200. In various implementations, only portions of method 300 are used, e.g., on only particular forms of input data, and/or only a subset of the described mesh generating techniques are used. For example, some implementations can use only block 304; some implementations can use only blocks 302, 304, and 314; some implementations can use only blocks 302-308; some implementations can use only blocks 302, 304, and 310-314; etc.

Some of the techniques described herein are root-finding techniques. In described examples, root-finding techniques can use a convention that represents surfaces or lines with equations that have a zero on one side of the equation. For example, $x^2+y^2=r^2$ defines a circle, and in described implementations the equation is arranged as $x^2+y^2-r^2=0$. This allows having one expression instead of two expressions, and defines the surface function such that a zero result of the function is a point on the surface defined by the function. Techniques described herein can find zeroes, e.g., determine the x and y values that satisfy the function to result in zero. The sets of values that obtain a zero result are the roots of the equation.

One or more described root-finding techniques determine a close neighborhood where a zero of the surface function must be located. More specifically, if $f(x1, y1)<0$ (e.g., this point is outside the volume) and $f(x2, y2)>0$ (e.g., this point is inside the volume), and $f(\ )$ is continuous, then $f(x, y)=0$ somewhere in between these points. The surface is where a sign changes to the opposite sign. Whether a result less than zero is inside and greater than zero is outside, or vice versa, is an arbitrary convention, and either convention can be used in described techniques. In some implementations, if one vertex (corner) of a voxel edge (or other voxel line segment) is inside the volume, and the other corner is outside the volume, then a search along that edge is guaranteed to find a point on the surface, e.g., a zero point. There can be multiple zero points, but this particular zero is the intersection of the surface and the edge.

Method 300 may begin at block 302. In block 302, it is determined whether the surface is described by a known surface function. Method 300 can be used in some implementations that are to process input data that includes a representation of a surface described by a surface function. In some examples, the surface function can be a signed distance function for which input data values represent distances of voxel corners (or other voxel reference points) to the surface. In some implementations, the surface function that describes the surface may be specified and included in the input data received by system implementing method 300, or the function may be otherwise known by the system (e.g., stored by the system and associated with the input data, specified by user command, etc.). In some examples, it may be useful to convert a specified function into a mesh to illustrate the function.

In further examples, values may have previously been specified at the corners of voxels and the surface function may have been created based on previous linear interpolation indicating how the surface changes through space. In additional examples, commands may specify to change an existing voxel grid in the input data to a different voxel grid used for generating the mesh (e.g., a grid having a different resolution), and the surface function is specified to enable such a conversion to a different grid.

In some implementations, any of various methods can be used to enable the system performing method 300 to determine whether there is a surface function that describes (or is associated with) the input data, such as providing a field or flag in the input data that indicates the presence of a surface function, receiving a command from a user, etc. In some implementations, a surface function may be determined in other ways, e.g., a particular type of input data or input data from a particular source can be associated with a particular surface function.

If the surface represented in the input data is described by a known surface function, then one or more root-finding techniques can be used and the method continues to block 306, described below. If the surface represented in the input data is not described by a known surface function, e.g., the input data is in a form of occupancy values or density values, then the method can continue to block 304 in which one or more techniques other than root-finding can be used. For example, method 800 of FIG. 8 described below can be used for input data in the form of occupancy values or density values. In some implementations, method 900 of FIG. 9 can be used. In some implementations, even if the surface is described by a known surface function, other techniques (such as method 800 and/or 900) can be used via block 304 instead of or in addition to one or more root-finding techniques. In some implementations, other techniques can be used to find the mesh vertices, e.g. linear interpolation, in addition to other described techniques. A mesh is generated using the one or more techniques of block 304, including estimations of vertex positions of the mesh.

Block 306 is performed if the input data is described by a known surface function as determined in block 302. In block 306, it is determined whether the surface function has a (practical) analytic solution (e.g., is an analytic function). An example of such a function is a field function that is expressed analytically and admits a closed-form solution. Since the surface function is known and analytic, it can be solved directly for its value at any position, e.g., to find the exact roots of the surface function. Examples of analytic functions include a first order polynomial, a second-order polynomial, a third-order polynomial, a fourth order polynomial, or other functions.

In some examples, trilinear interpolation of discrete voxels is third order and can qualify as a function that has an analytic solution. Other functions may be analytically solvable. For example, the input data may be based on a specified function that is analytically solvable (e.g., an equation describing how air flows over a wing, etc.) to provide a visualization of the data as a mesh. In some implementations, any of various methods can be used to enable the system performing method 300 to determine whether the surface function is solvable analytically, such as a field or flag in the input data, a command from a user, stored characteristics which the system can access and compare to a received surface function, a machine learning model trained with analytic function examples and used to detect whether the surface function is an analytic function, etc.

If the surface is not described by a surface function that has an analytic solution, then the method continues to block 310, described below. If the surface is described by a surface function that has an analytic solution, then the method continues to block 308, in which positions of vertices of the mesh are determined by using an analytic root-finding technique, which includes solving the analytic surface function for roots. For example, on each edge (or other line segment) of a voxel through which the surface has been detected to intersect, the exact position of that intersection along the edge (and the position of a mesh vertex) is determined by solving for the root the surface function. In some implementations, values of voxels specified in the input data, or values otherwise derived from the input data, can be used in the solving for the root (e.g., depending on how the surface is represented in the input data). The mesh is generated based on positions of the mesh vertices being determined based on solving for these roots. Solving the surface function directly for the positions of the vertices of the mesh allows the vertices of the mesh to be placed exactly on the surface at its intersection points with the intersected voxels.

Block 310 is performed if, in block 306, the surface is determined to not be described by a surface function that has an analytic solution. In block 310, it is determined whether the surface function is differentiable, e.g., a derivative can be derived from the surface function. In some implementations, any of various methods can be used to enable the system performing method 300 to determine whether the surface function has a derivative, such as a field or flag in the input data, a command from a user, stored characteristics of differentiable functions which the system can access and compare to a received surface function, a machine learning model trained with differentiable function examples and used to detect whether the surface function is a differentiable function, etc.

If the surface function differentiable as determined in block 310, then the method continues to block 314, described below. If the surface function is differentiable as determined in block 310, then the method continues to block 312, in which the positions of the vertices of the mesh are determined using a root-finding technique based on a derivative of the surface function. For example, this block can find numeric root(s) of the surface function and iterate the positions of the vertices closer to the surface. The numeric root-finding technique determines roots by evaluating the derivative of the surface function, and can find positions of mesh vertices closer to the surface via iteration of the root finding. Examples of implementing block 308 are described in greater detail below with reference to FIG. 4. Using the numeric root-finding technique with derivatives, the mesh can be generated with estimations of mesh vertex positions that are close to the actual positions of the surface intersections with the voxels.

Block 314 is performed if, in block 310, the surface function is not differentiable. In some implementations or cases, block 314 can also be performed even if the surface function is differentiable, e.g., if it is desired to use one or more other root-finding techniques that do not use function derivatives, to find mesh vertices in addition to, or instead of, a root-finding technique of block 312.

In block 314, positions of mesh vertices are determined using a numeric root-finding technique with iterative refinement. For example, this block can use any of a number of different techniques to find roots of the surface function, where such techniques do not require a derivative of the surface function. Multiple techniques can be used in some implementations. The iterative refinement of this described technique provides more accurate positions of the vertices (e.g., closer to the surface) than when using the root-finding techniques without the iteration. Examples of implementing block 314 are described in greater detail below with reference to FIG. 6. Using the root-finding technique with iterative refinement, the mesh can be generated with estimations of vertex positions that are close to the actual positions of the surface intersections with the voxels.

In some implementations, after determining the positions of mesh vertices (e.g., in block 304, block 308, block 312, or block 314), additional processing can be performed to position one or more of the vertices more accurately (e.g., closer to the actual surface) by performing one or more additional techniques. For example, the method 900 of FIG. 9 can subdivide the mesh into additional mesh line segments, and can be performed in addition to (e.g., after or before) one or more other techniques described herein.

Using Derivative of Surface Function to Determine Mesh

Figure 4:
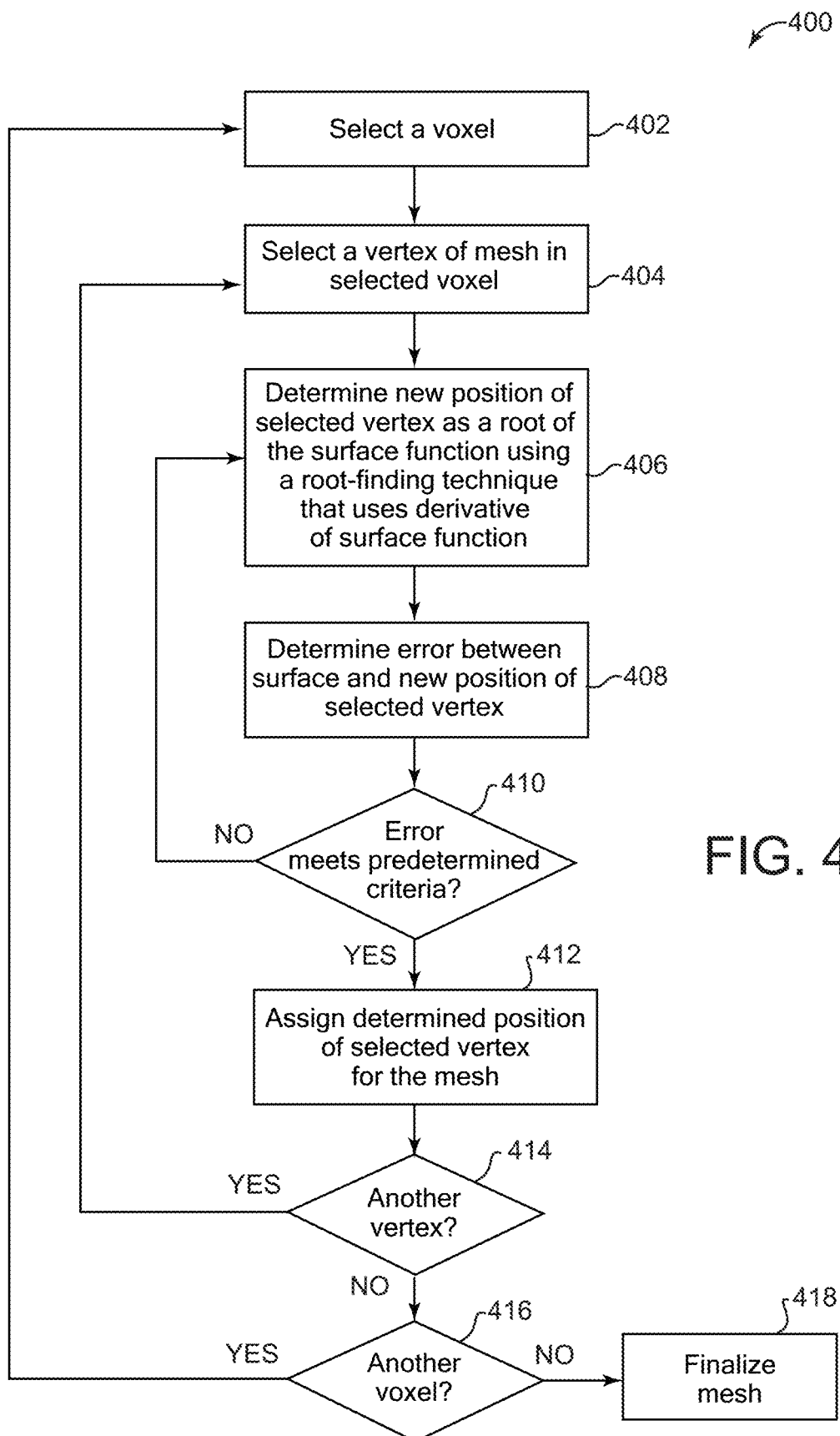
FIG. 4 is a flow diagram of an example method of determining the positions of vertices of a mesh that approximates a surface using a numeric root-finding technique based on a derivative of the surface function, in accordance with some implementations.

FIG. 4 is a flow diagram of an example method 400 of determining the positions of vertices of a mesh that approximates a surface using a numeric root-finding technique based on a derivative of the surface function, in accordance with some implementations. For example, method 400 can be an example implementation of block 312 of method 300 of FIG. 3, or can be performed independently or separately from method 300. In some implementations, method 400 can be performed, for example, on a server system and/or client system similarly as described for methods 200 and 300.

It should be noted that the terms "edge" or "edge of a voxel" are used in the description of method 400 for explanatory purposes. An edge of a voxel can be more generically described as a line segment of a voxel. For example, in some implementations, a line segment can be an actual edge of a face of a cubical voxel. In some implementations, e.g., in some mesh generation techniques such as some surface nets or similar techniques that can be used with method 400, a line segment can be a line that connects adjacent voxel centers (or connects other portions of two adjacent voxels). In these latter implementations, such line segments can be used instead of edges of voxels, e.g., vertices in method 400 can be determined or selected along such line segments of voxels rather than along actual edges of voxels.

Method 400 may begin at block 402. In block 402, a voxel is selected from the grid of voxels to be processed. The voxel is one of the voxels in the grid that is determined to be intersected by the surface, e.g., in block 206 of FIG. 2. The method continues to block 404.

In block 404, a vertex in the selected voxel is selected. In some implementations, a vertex on an edge of the selected voxel is selected, the edge being intersected by the surface. The selected vertex has a current position. In some implementations, the selected vertex can be a corner of the selected voxel for which a voxel value represents in the input data (the voxel values of the input data can represent other reference points (portions) of voxels in other implementations, e.g., centers of voxels). In some implementations, the selected vertex can be determined using other techniques, e.g., a mid-point of the intersected edge of the selected voxel or a position estimated by a different technique. The vertexes selected in iterations of method 400 can be constrained to dimensions of a voxel space of the selected voxel.

In some implementations, after the edge (line) is determined on which to search for a mesh vertex, the surface function is transformed from a 2D or 3D function into a linear function on that edge. The transformation can include plugging the equation of the line into the surface function. For example, if the surface function is a sphere (e.g., $x^2+y^2=100$), and the edge being searched on is y=3 (e.g., a horizontal edge having a constant y-axis value), then plugging the line into the surface function yields a result of $x^2+3^2=100$, that is, $x^2+9=100$, or $x^2=91$ as the equation on that edge. In this simple example the solution can be exactly determined, but with more complex surface functions, the result can remain difficult to solve. The method continues to block 406.

In block 406, a new position of the selected vertex is determined as a root of the surface function (e.g., the transformed function described above) using a root-finding technique that uses a derivative of the surface function. The surface function is defined such that it is equal to zero at the surface, and finding the root corresponds to finding the point on the surface. In method 400, the surface function does not have a analytic solution and is differentiable.

For example, the root-finding technique can find a root of an equation that involves the derivative of the surface function. The new position of the selected vertex can be where a derivative tangent line to the selected vertex intersects the surface. The zero of the tangent line to the surface function at the current position can be used as an approximation of the zero of the surface function. In some examples, a Newton-Raphson root-finding technique can be used. In some implementations, finite differences of the surface function can be used to approximate the derivative of the surface function from discrete samples or values in the input data. In some examples, the Newton-Raphson technique solves for the derivative being zero, using the equation below:

$$x_{n+1} = x_n - \frac{f(x_n)}{f'(x_n)}$$

where $(x_n, f(x_n))$ is the selected vertex (in 2D) for the nth iteration such that $X_n$ is the current position of the selected vertex on the voxel edge and $f(x_n)$ is the surface function evaluated at the position of the selected vertex; $(X_{n+1}, f(x_{n+1}))$ is the resulting vertex, and $f'(x_n)$ is the derivative of the surface function evaluated at the current position of the selected vertex. This equation divides the surface function at the selected vertex by the derivative of the surface function at the selected vertex, and subtracts the result from the current position of the selected vertex. The result is a vertex $(X_{n+1}, f(x_{n+1}))$ that is closer to the actual intersection point of the surface with the edge of the voxel, where $X_{n+1}$ is the new position of the selected vertex. The method continues to block 408.

In block 408, an error is determined between the surface and the new position of the selected vertex determined in block 406. For example, this error can be determined by evaluating the surface function with the value of the new position determined in block 406, and determining the difference between the function result and zero. A result of zero from the evaluation of the surface function indicates that the new position of the selected vertex is precisely on the surface and thus accurately provides the intersection point of the surface and the voxel edge. The method continues to block 410.

In block 410, it is determined whether the error determined in block 408 meets one or more predetermined criteria (and/or the predetermined criteria are otherwise met). For example, if a threshold amount of error has been predetermined for use with block 410, then it is checked whether the error is less than the threshold (or greater than the threshold, in other implementations). Other or additional criteria can also be used in various implementations. In some implementations, the number of iterations of blocks 406-410 that have been performed can be alternative or additional criteria for the determination of block 410. For example, if the number of iterations that have been performed is above an iteration threshold (e.g., 3 iterations), then the predetermined criteria are met. If the predetermined criteria are met, then the method continues to block 412, described below.

If the predetermined criteria of block 410 are not met, then the new position of the selected vertex in the current iteration is set as the current position of the selected vertex and another iteration of the root-finding technique is initiated by continuing to block 406 to determine a new position of the selected vertex. Thus, the selected vertex is adjusted (e.g., moved) along the edge of the voxel to the (new) current position that is closer to the actual position of intersection. In the next iteration, a newer position of the selected vertex is determined in block 406 using the root-finding technique at the (new) current position as described above. This newer position is closer than the previous position to the actual location of intersection of the surface with the voxel. The newer position is evaluated for error in block 408 similarly as described above, until the predetermined criteria are met in block 410.

In some implementations, a current position of the selected vertex can be adjusted (e.g., moved) an additional amount or magnitude that is closer to the actual point of intersection. For example, the additional amount can be based on the determined error, or can be a predetermined amount. For example, a magnitude of the error determined in block 408 may indicate how close the approximate position is to the actual position, and the vertex can be additionally moved based on (e.g., proportional to) the error to an estimated position that is closer to the actual position.

In block 412, the predetermined criteria of block 410 have been met, and the determined position of the selected vertex is assigned to the mesh being generated. The method continues to block 414.

In block 414, it is determined whether there is another mesh vertex of the selected voxel to process. For example, one or more mesh vertex positions on other edges of selected voxel may not yet be determined via method 400. If there is another mesh vertex of the selected voxel to process, the method continues to block 404 to select another vertex to process. If there are no more vertices of the selected voxel to process, the method continues to block 416.

In block 416, it is determined whether there is another voxel of the voxel grid to process. If there is another voxel to process, the method continues to block 402 to select another voxel to process. In various implementations, a voxel adjacent to the voxel just processed can be selected, or a different voxel of the voxel grid can be selected. In some implementations, not all of the voxels through which the surface intersects are processed by method 400, e.g., based on predetermined thresholds or other criteria. If there are no more voxels of the voxel grid to process, the method continues to block 418 to finalize the mesh. For example, additional processing of the mesh can optionally be performed, e.g., further adjust mesh vertices using one or more additional techniques (e.g., method 900 of FIG. 9), store the mesh, display the mesh, etc.

While FIG. 4 illustrates a voxel-by-voxel determination of the mesh, it will be understood that one or more blocks of method 400 can be performed substantially in parallel. For example, block 402 may be performed to select multiple voxels, and blocks 404-414 may be performed substantially in parallel for each selected voxel. In another example, in block 404, more than one vertex may be selected; for each selected vertex, blocks 406-412 may be performed substantially in parallel. Parallel execution may improve the speed of determination of mesh (since multiple voxels/vertices may be subjected to calculation simultaneously). Further, parallel execution may better utilize processor resources, e.g., when the processor includes multiple processing cores (e.g., a GPU or a multi-core processor) and/or can support parallel execution of multiple threads.

Graph Showing Root-Finding Using a Differentiable Surface Function

Figure 5:
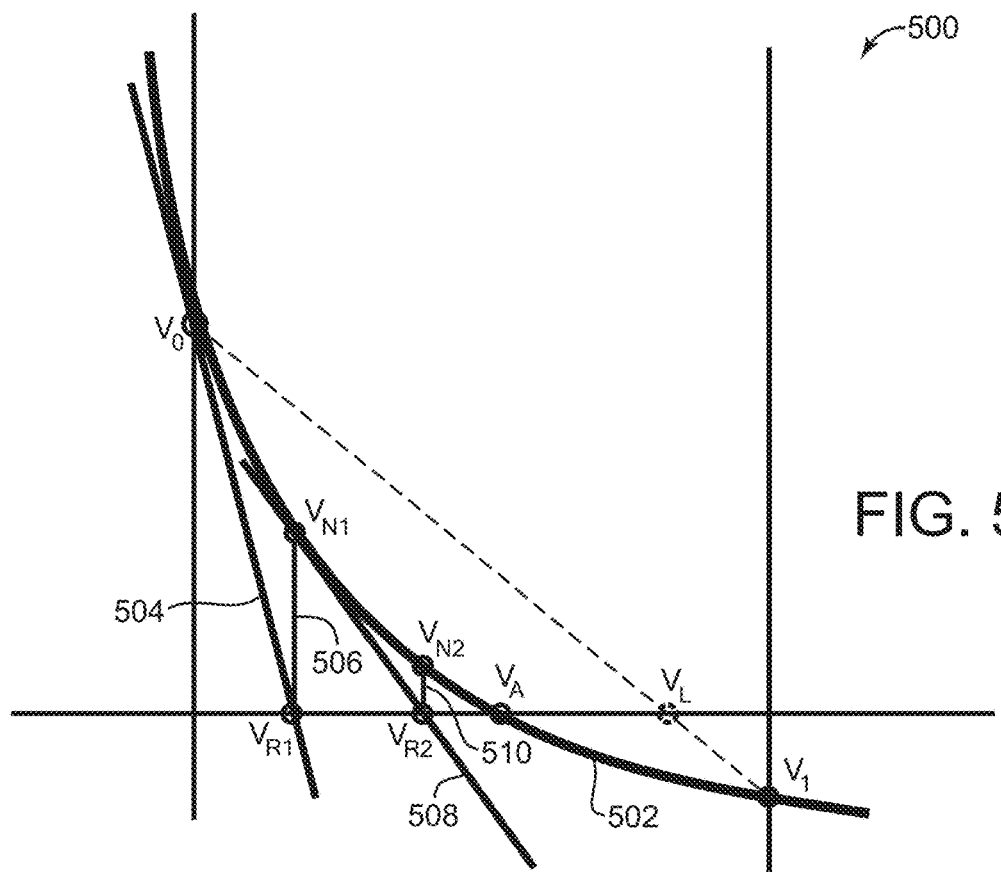
FIG. 5 is a diagrammatic illustration of a graph showing an example of using a root-finding technique using a differentiable surface function to find a position of a vertex of a mesh, in accordance with some implementations.

FIG. 5 is an illustration of a graph 500 showing an example of using a root-finding technique using a differentiable surface function to find a position of a vertex of a mesh, according to some implementations. In some implementations, the example of FIG. 5 is based on the method 400 of FIG. 4.

Graph 500 illustrates a 2D example for simplicity. Graph 500 shows a curve 502 that represents the surface function for positions on an edge between two original vertices (e.g., corners) of a voxel. The surface function has been transformed from a 2D or 3D function into a linear function on that (edge) line as described above with respect to block 404 of FIG. 4. The x-axis represents positions across an edge of the voxel between two original vertices V0 and V1 of the voxel (e.g., corners of the voxel). The y-axis represents the value of the surface function at the positions. The vertices V0 and V1 have y-values (of x-y coordinates) included in the input data as voxel values that indicate the value of the surface function at their respective positions. The y-value at V0 is positive and the y-value at V1 is negative, which indicates that the surface intersects the voxel edge at a position between the x-values of vertices V0 and V1. Vertex $V_A$ is at the actual position of intersection between the surface and the edge of the voxel (where $V_A$ is unknown). The intersection of the surface and the edge is at y=0 where the surface function is zero (a root of the surface function). This position is neither above the surface (a positive value on the y-axis) or below the surface (a negative value on the y-axis).

In some cases, the position of vertex $V_A$ can be determined directly by evaluating the surface function to find this position that results in the surface function being equal to zero (a root), if the surface function has an analytic solution as described with reference to blocks 306 and 308 of FIG. 3. In a case where the surface function does not have an analytic solution, a different root-finding technique can be used to find a vertex position that is close to position $V_A$. In this example, the surface function is differentiable, so a root-finding technique that uses a derivative of the surface function can be used, e.g., a Newton-Raphson root-finding technique.

A tangent line 504 is determined in a first iteration using the root-finding technique, where line 504 represents a tangent line of the point V0 based on the derivative of the surface function. Tangent line 504 has a root at position $V_{R1}$ where line 504 intersects the horizontal axis. Position $V_{R1}$ is not the actual position $V_A$ of the intersection, and thus the surface function provides a point $V_{N1}$ on curve 502 that is above the x-axis as shown when the surface function is evaluated with position $V_{R1}$. Position $V_{R1}$ has an error that, in some implementations, can be represented by the difference in position (along the y-axis) between $V_{R1}$ and $V_{N1}$, shown as segment 506.

The error between $V_{N1}$ and zero (the y-value of $V_A$) is determined to not meet the criteria (e.g., the error is above a threshold), and another iteration of the root-finding technique is performed with point $V_{N1}$ as the position of the mesh vertex instead of point V0 of the last iteration. In effect, the position of the vertex has been adjusted (moved) from V0 to $V_{N1}$. A tangent line 508 of the point $V_{N1}$ is determined based on the derivative of the surface function. Tangent line 508 has a root at position $V_{R2}$ where line 508 intersects the horizontal axis. Position $V_{R2}$ is different than the actual position $V_A$ of the intersection, such that the surface function provides a point $V_{N2}$ on curve 502 that is above the x-axis as shown when the surface function is evaluated with position $V_{R2}$. Point $V_{N2}$ is closer to $V_A$ than point $V_{N1}$. Position $V_{R2}$ has an error that can be represented by the difference in position (along the y-axis) between $V_{R2}$ and $V_{N2}$, shown as segment 510.

If the error between $V_{R2}$ and zero (the y-value of $V_A$) still does not meet the criteria, another iteration can be performed with point $V_{N2}$ as the starting point instead of $V_{N1}$; and so on, with additional iterations as needed. When the error between the determined zero position and $V_A$ meets the criteria, then the iterations are not continued and the zero position is considered the position of the mesh vertex.

Using Root-Finding With Iterative Refinement to Determine Mesh

Figure 6:
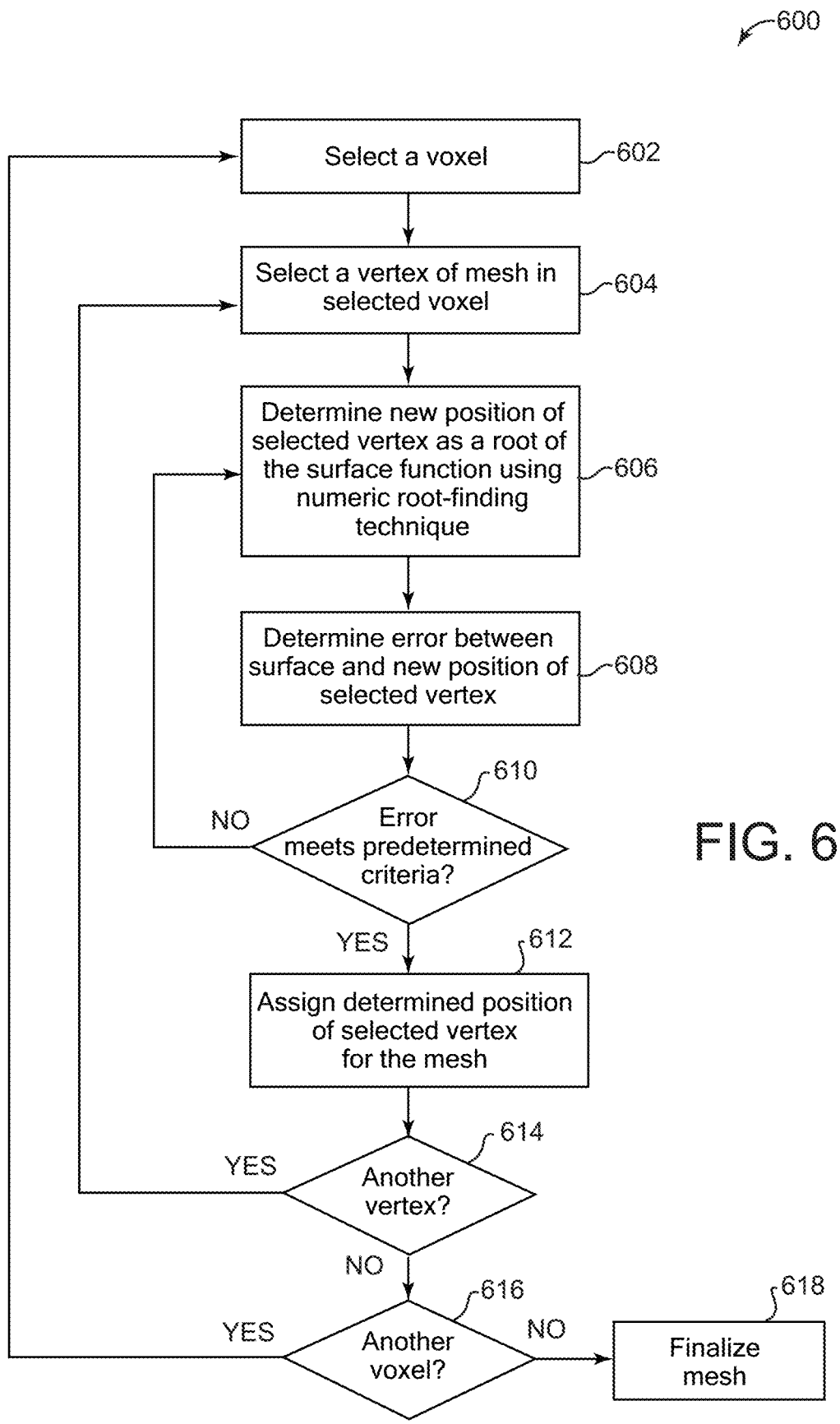
FIG. 6 is a flow diagram of an example method of determining the positions of vertices of a mesh that approximates a surface using a numeric root-finding technique with iterative refinement, in accordance with some implementations.

FIG. 6 is a flow diagram of an example method 600 of determining the positions of vertices of a mesh that approximates a surface using a numeric root-finding technique with iterative refinement, in accordance with some implementations. For example, method 600 can be an example implementation of block 314 of method 300 of FIG. 3, or can be performed independently or separately from method 300. For method 600, the surface function for which the mesh is approximated can be a non-differentiable function, or can be a differentiable function. In some implementations, method 600 can be performed, for example, on a server system and/or client system similarly as described for methods 200 and 300.

It should be noted that the terms "edge" or "edge of a voxel" are used in the description of method 600 for explanatory purposes. Similarly as described for method 400, in some implementations, a line segment can be an actual edge of a face of a cubical voxel, while in some implementations, e.g., in some mesh generation techniques such as some surface nets or similar techniques that can be used with method 600, a line segment can be a line that connects adjacent voxel centers (or connects other portions of two adjacent voxels). In these latter implementations, such line segments can be used instead of edges of voxels, e.g., vertices in method 600 can be determined or selected along such line segments of voxels rather than along actual edges of voxels.

Method 600 may begin at block 602. In block 602, a voxel is selected from the grid of voxels to be processed. The voxel is one of the voxels in the grid that is determined to be intersected by the surface, e.g., in block 206 of FIG. 2. The method continues to block 604.

In block 604, a vertex in the selected voxel is selected for the mesh. In some implementations, a vertex on an edge of the selected voxel is selected, the edge being intersected by the surface. The selected vertex has a current position. In some implementations, the selected vertex can be a corner of the selected voxel for which a value is known from the input data. In some implementations, two vertices are selected in block 604, where the selected vertex is one of two known vertices, e.g., two vertices in a voxel that are known to bracket a root such that a line intersecting these vertices crosses the surface. In some implementations, the selected vertex can be determined using other techniques, e.g., a mid-point of the intersected edge of the selected voxel or a position estimated by a different technique. The vertices selected in iterations of method 600 can be constrained to dimensions of a voxel space of the selected voxel.

In some implementations, after the edge is determined on which to search for a mesh vertex, the surface function is transformed from a 2D or 3D function into a linear function on that edge, e.g., similarly as described above with respect to block 404 of FIG. 4. The method continues to block 606.

In block 606, a new position of the selected vertex (or of one of the selected vertices) is determined as a root of the surface function (e.g., the transformed function described above) using a numeric root-finding technique. The root-finding technique can find a root of the surface function, e.g., the position where the surface function results in zero and where the surface intersects the edge of the voxel.

One or more of various numeric root-finding techniques can be used. In some examples, the root-finding techniques can include the bisection technique (e.g., find the mid-point of the line between two known voxel edge vertices that bracket a root, and evaluate the surface function at the mid-point), secant technique (e.g., linear interpolation through two most recent points or two endpoints), Bezier clipping technique (e.g., convert the function to a Bezier curve and clip ends), false position technique (e.g., interpolate through two most recent points, with bracketing), Ridders' technique (e.g., fit exponential to function at positive, negative, and mid-points), Van Wijngaarden-Dekker-Brent technique (e.g., inverse quadratic fit to three most recent points), and/or other root-finding techniques. The zero result of the root-finding technique can be used as an approximation of the zero of the surface function. The result is a vertex that is closer to the actual intersection point of the surface with the edge of the voxel.

In an example of using linear interpolation in a bisection technique, two vertices are selected in block 604 that are known to bracket a root of the surface function; for example, one of the vertices has a positive value and the other vertex has a negative value. A line is extended between these vertices and the mid-point of the line is determined as an approximate root. The mid-point produces a vertex interpolated between the two vertices that is proportional to the positions of the two vertices, e.g., if the underlying surface function is linear (e.g., in some implementations the function may be non-linear, e.g., bilinear or bicubic). The method continues to block 608.

In block 608, an error is determined between the surface and the new position of the selected vertex determined in block 606. In some examples, this error can be determined by evaluating the surface function with the value of the new position determined in block 606, and determining the difference between the function result and zero. A result of zero from the evaluation of the surface function indicates that the new position of the selected vertex is precisely on the surface. The method continues to block 610.

In block 610, it is determined whether the error determined in block 608 meets one or more predetermined criteria (and/or the predetermined criteria are otherwise met). For example, if a threshold amount of error has been predetermined for use with block 610, then it is determined whether the error is less than the threshold (or greater than the threshold, in other implementations). Other or additional criteria can also be used in various implementations. In some implementations, the number of iterations of blocks 606-610 that have been performed can be alternative or additional criteria for the determination of block 610. For example, if the number of iterations that have performed is above an iteration threshold (e.g., 3 iterations), then the predetermined criteria are met. If the predetermined criteria are met, then the method continues to block 612, described below.

If the predetermined criteria of block 610 are not met, then the new position of the selected vertex in the current iteration becomes (is assigned to) the current position of the selected vertex (or one of the selected vertices, if two vertices were selected), and the method starts another iteration of the root-finding technique by continuing to block 606 to determine a new position of the selected vertex. Thus, the selected vertex is adjusted (e.g., moved) along the edge of the voxel to the (new) current position that is closer to the actual position of intersection.

For example, in some implementations of the example above using the bisection technique and two selected vertices, the new position can replace one of selected vertices. For example, if the evaluation of the surface function at the new position has a positive result, the new position can be assigned to replace a first one of the two selected vertices that is positive. If the evaluation of the surface function at the new position has a negative result, the new position can be assigned to replace a second one of the two selected vertices that is negative. Thus, the two vertices continue to bracket the zero position.

In the next iteration, a newer position of the selected vertex is determined in block 606 at the (new) current position similarly as described above. This newer position is closer than the previous position to the actual location of intersection of the surface with the voxel. The newer position is evaluated for error in block 608 similarly as described above, until the predetermined criteria are met in block 610. This method thus can provide a repeated subdivision of the error interval over multiple iterations.

In some implementations, a current position of the selected vertex can be adjusted (e.g., moved) an additional amount or magnitude that is closer to the actual point of intersection. For example, the additional amount can be based on the determined error, or can be a predetermined amount. For example, a magnitude of error determined in block 608 may indicate how close the approximate position is to the actual position, and the vertex can be additionally moved based on (e.g., proportional to) the error to an estimated position that is closer to the actual position. In some implementations, parameters used in the successive over-relaxation of method 600 can be tuned for different types of input data.

In block 612, the predetermined criteria of block 610 have been met, and the determined position of the selected vertex is assigned to the mesh being generated. The method continues to block 614.

In block 614, it is determined whether there is another mesh vertex of the selected voxel to process. For example, one or more mesh vertex positions on other edges of selected voxel may not yet be determined via method 600. If there is another mesh vertex of the selected voxel to process, the method returns to block 604 to select another vertex to process. If there are no more vertices of the selected voxel to process, the method continues to block 616.

In block 616, it is determined whether there is another voxel of the voxel grid to process. If there is another voxel to process, the method returns to block 602 to select another voxel to process. In some implementations, a voxel adjacent to the voxel just processed can be selected, or a different voxel of the voxel grid can be selected. In some implementations, not all of the voxels through which the surface intersects are processed by method 600, e.g., based on predetermined thresholds or other criteria. If there are no more voxels of the voxel grid to process, the method continues to block 618 to finalize the mesh. For example, additional processing of the mesh can optionally be performed, e.g., further adjust mesh vertices using one or more additional techniques (e.g., method 900 of FIG. 9), store the mesh, display the mesh, etc.

While FIG. 6 illustrates a voxel-by-voxel determination of the mesh, it will be understood that one or more blocks of method 600 can be performed substantially in parallel. For example, block 602 may be performed to select multiple voxels, and blocks 604-614 may be performed substantially in parallel for each selected voxel. In another example, in block 604, more than one vertex may be selected; for each selected vertex, blocks 606-612 may be performed substantially in parallel. Parallel execution may improve the speed of determination of mesh (since multiple voxels/vertices may be subjected to calculation simultaneously). Further, parallel execution may better utilize processor resources, e.g., when the processor includes multiple processing cores (e.g., a GPU or a multi-core processor) and/or can support parallel execution of multiple threads.

An example of one implementation of method 600 is shown below as pseudocode for a marching triangles technique, using linear interpolation and bisection root-finding technique that divides the error interval in half for each iteration. Other implementations can use other mesh generation techniques, e.g., surface nets, etc. with similar root-finding techniques of method 600.

```
/* Result is an array of {x:, y:} vertices for a polygon in pixel
coordinates, or null if there is no polygon. There will be either 3 or
4 vertices to the polygon, depending on the case.
A, B, C are in pixel coordinates. */
function getIsoPoly(density, A, B, C) {
   const vertex = [{point: A}, {point : B}, {point: C}];
   let numInside = 0;
   for (let V of vertex) {
      V.density = density(V.point);
      V.inside = (V.density >= THRESHOLD) ? 1 : 0;
      if (V.inside) { ++numInside; }
   }
   // Switch based on which of the 8 cases we're in, which reduce to
   // 2 trivial cases plus 2 cases with 3-way rotational symmetry.
   switch (numInside) {
   case 0: // All outside (case 000)
      return null;
   case 1: // One inside -> tri (cases 100, 010, 001)
      // Cyclic shift until vertex [0] is the one inside
      while (! vertex[0].inside) { vertex.unshift(vertex.pop( )); }
      // Produce the triangle with tip at 0
      return [cloneXY(vertex[0].point) ,
         rootFindVertex(vertex[1], vertex[0], density),
         rootFindVertex(vertex[2], vertex[0], density)];
   case 2: // Two inside -> quad (cases 101, 110, 011)
      // Cyclic shift until vertex[0] is the one outside
      while (vertex[0].inside) { vertex.unshift (vertex.pop( )); }
      // Produce the quad cutting off point 0
      return [cloneXY(vertex[1].point) ,
         rootFindVertex(vertex[0], vertex[1], density) ,
         rootFindVertex(vertex[0], vertex[2], density),
         cloneXY(vertex[2]. point)];
      return;
   case 3: // All inside (case 111)
      return [cloneXY(A) , cloneXY(B) , cloneXY(C)];
   } // switch
}
/* Given two vertices {point: {x:, y:}, value:},
produces the vertex interpolated between them proportional to their
positions, so as to interpolate to the THRESHOLD (surface)... if the
underlying density was linear (it is typically bilinear or bicubic, so
this is only a single-iteration root finding).
```

```
Assume A.density < THRESHOLD and B.density >= THRESHOLD.
*/
function rootFindVertex(A, B, density) {
    console.assert(A.density < THRESHOLD) ;
    console.assert(B.density >= THRESHOLD) ;
    if (ROOT_ITERATIONS === 0) {
        // 0 iterations; just move halfway
        return {x: (A.point.x + B.point.x) * 0.5,
            y: (A.point.y + B.point.y) * 0.5};
    } else {
        // General case. Binary search
        for (let i = 0; i < ROOT_ITERATIONS − 1; ++i) {
            // Slide C between A and B
            const C = {point: lerpXY(A.point, B.point,
                    (THRESHOLD − A.density) / (B.density −
A.density))};
            // Prepare for the next iteration
            C.density = density(C.point);
            if (C.density >= THRESHOLD) {
                // Isosurface is between A and Cs
                B = C;
            } else {
                // Isosurface is between C and B
                A = C;
            }
        } // binary search
    } // for i
    // Final iteration
    return lerpXY(A.point, B.point,
            (THRESHOLD − A.density) / (B.density − A.density));
    }
}
```

Figure 7:
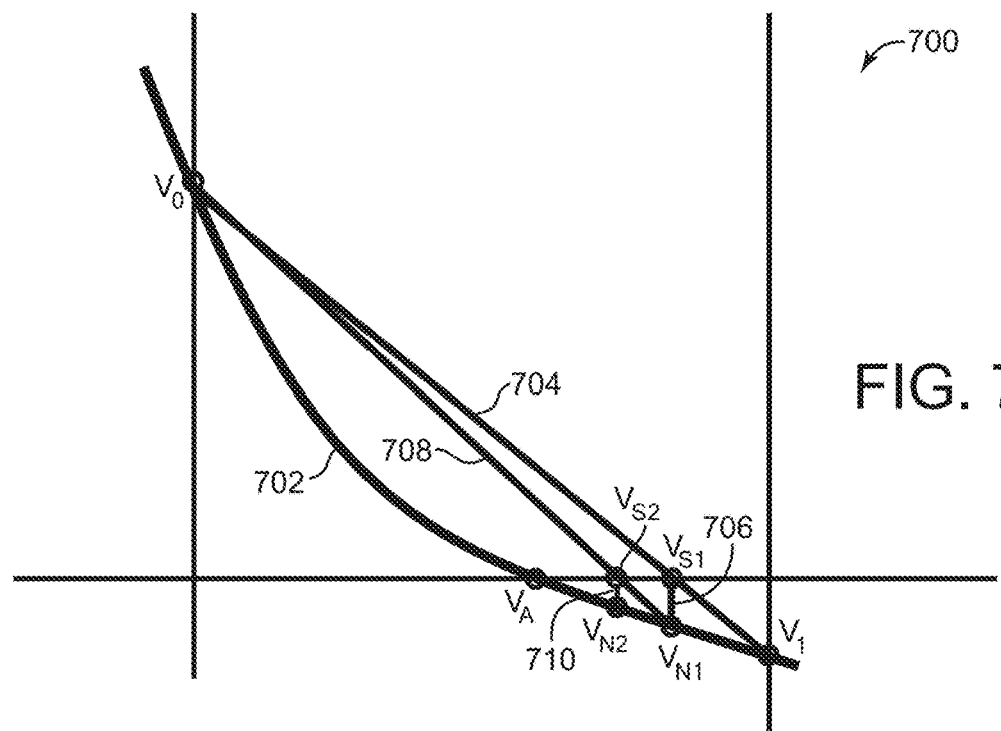
FIG. 7 is a diagrammatic illustration of a graph showing an example of using a root-finding technique with iterative refinement to find a position of a vertex of a mesh, in accordance with some implementations.

Graph Showing Root-Finding Using a Root-Finding Technique With Iterative Refinement FIG. 7 is an illustration of a graph 700 showing an example of using a root-finding technique with iterative refinement to find a position of a vertex of a mesh, according to some implementations. In some implementations, the example of FIG. 7 is based on the method 600 of FIG. 6. For example, the surface function used for the example of FIG. 7 can be a differentiable function or can be a non-differentiable function.

Graph 700 illustrates a 2D example for simplicity. Graph 700 shows a curve 702 that represents the surface function over positions on an edge between two original vertices (e.g., corners) of a voxel, similar to curve 502 of FIG. 5. The surface function has been transformed from a 2D or 3D function into a linear function on that (edge) line as described above with respect to block 604 of FIG. 6. The x-axis represents positions across an edge of the voxel between two original vertices V0 and V1 of the voxel (e.g., corners of the voxel). The y-axis represents the value of the surface function at the positions. The y-value at V0 is positive and the y-value at V1 is negative, which indicates that the surface intersects the voxel edge at a position $V_A$ between the x-values of vertices V0 and V1 (where $V_A$ is unknown).

In a case where the surface function is continuous and does not have an analytic solution, a root-finding technique can be used to find a vertex position that is close to position $V_A$. In this example, the surface function can be differentiable or non-differentiable; the root-finding techniques can find roots for any continuous function.

A line 704 is determined in a first iteration using the root-finding technique for vertex V0. For example, linear interpolation with the secant root-finding technique can be used, where the point $V_{S1}$ is interpolated. For example, point $V_{S1}$ can be determined using the below equation of the secant technique:

$$V_{S1} = V1 - f(V1)\frac{V1 - V0}{f(V1) - f(V0)}$$

In this example, line 704 is a straight line that extends between points V0 and V1 to approximate the surface function curve 702. The root position $V_{S1}$ of line 704 intersects the horizontal axis where the line 704 has a y-value of zero. Position $V_{S1}$ is different than the actual root position $V_A$ of the surface function curve 702, and thus the surface function $f$ provides a point $V_{N1}$ on curve 702 that is below the x-axis as shown when the surface function is evaluated with position $V_{S1}$. Position $V_{S1}$ has an error that, in some implementations, can be represented by the difference in position (along the y-axis) between $V_{S1}$ and $V_{N1}$ (the surface function result at $V_{S1}$), shown as segment 706.

In this case, the error between $V_{N1}$ and zero (the y-value of $V_A$) is determined to not meet desired criteria (e.g., the error is above a threshold), and another iteration of the root-finding technique is performed with point $V_{N1}$ in place of point V1 of the last iteration. In effect, the position of a vertex has been adjusted (moved) from V1 to $V_{N1}$.

A line 708 is a straight line that extends between V0 and $V_{N1}$ in the second iteration. Line 708 has a root at position $V_{S2}$ where line 708 intersects the horizontal axis. Position $V_{S2}$ is different than the actual position $V_A$ of the intersection, such that the surface function provides a point $V_{N2}$ on curve 702 that is below the x-axis as shown when the surface function is evaluated with position $V_{S2}$. Point $V_{N2}$ is closer to $V_A$ than point $V_{N1}$. Position $V_{S2}$ has an error that can be represented by the difference in position (along the y-axis) between $V_{S2}$ and $V_{N2}$, shown as segment 710.

If the error between $V_{S2}$ and zero (the y-value of $V_A$) does not meet the error criteria, another iteration can be performed with point $V_{N2}$ replacing point $V_{N1}$; and so on with additional iterations as needed. When the error between the determined zero position and $V_A$ meets the criteria, then the iterations are not continued and the zero position can be considered the position of the mesh vertex.

Using a Successive Over-Relaxation Technique for Mesh Determination

Figure 8:
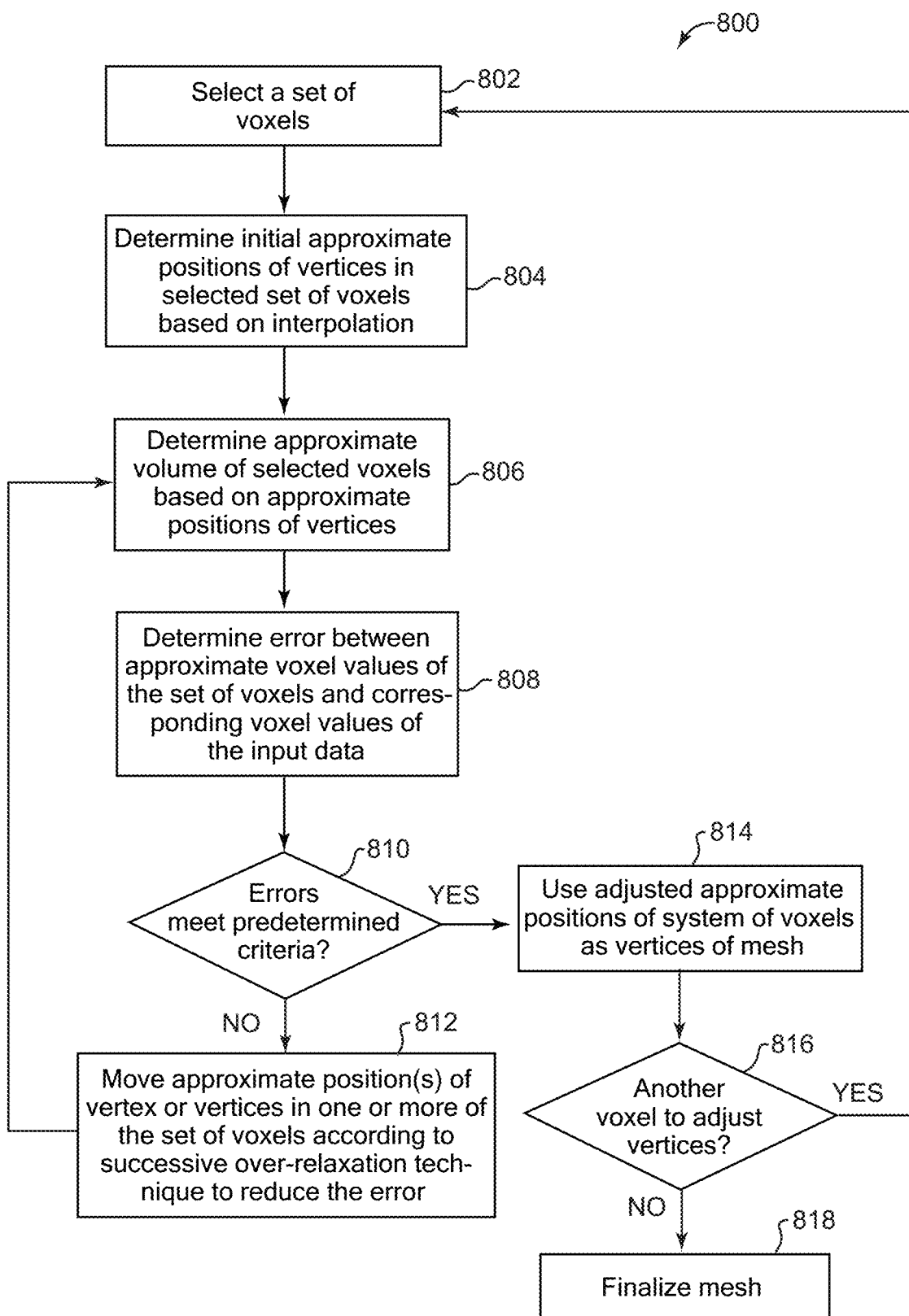
FIG. 8 is a flow diagram of an example method of determining the positions of vertices of a mesh that approximates a surface using a successive over-relaxation technique, in accordance with some implementations.

FIG. 8 is a flow diagram illustrating an example method 800 of determining the positions of vertices of a mesh that approximates a surface using a successive over-relaxation technique, in accordance with some implementations. For example, method 800 can be an example implementation of determining vertex positions in block 210 of method 200 of FIG. 2 described above. In some implementations, method 800 can be a technique used in block 304 of method 300 of FIG. 3, or can be used independently or separately from method 300 of FIG. 3, to determine vertex positions in a mesh. In some implementations, method 800 can be performed, for example, on a server system and/or client system similarly as described for methods 200 and 300.

It should be noted that the terms "edge" or "edge of a voxel" are used in the description of method 800 for explanatory purposes. Similarly to methods 400 and 600, in some implementations, a line segment can be an actual edge of a face of a cubical voxel, while in some implementations, e.g., in some mesh generation techniques such as some surface nets or similar techniques that can be used with method 800, a line segment can be a line that connects two adjacent voxel centers (or connects other portions of two adjacent voxels). In these latter implementations, such line segments can be used instead of edges of voxels, e.g., vertices in method 800 can be determined or selected along such line segments of voxels rather than along actual edges of voxels.

Method 800 can be used in some implementations in which input data is provided in a form of occupancy values or density values (both referred to as "occupancy values" in this method). Such values can indicate an amount of each defined voxel that is occupied by the volume that includes the surface. In some implementations, any of various forms of input data can be used in method 800, e.g., input data that represents the surface as described by a function, input data representing a surface not described by a function, etc.

Method 800 may begin at block 800. In block 802, a set of voxels in the input data is selected from the grid of voxels to be processed. In some implementations, the set of voxels is a subset of the entire set of voxels which the surface intersects. In some implementations, the set of voxels is a set of adjacent voxels of the voxel grid. For example, the set of adjacent voxels can be a set of 3×3 adjacent voxels, a set of 5×5 adjacent voxels, etc. By selecting a smaller set of voxels than the entire set, memory and/or processing power requirements can be reduced for the computing system used to generate the mesh. In some implementations, only the selected set of voxels is processed by method 800, and other voxels are ignored by method 800; in other implementations, multiple different sets of voxels can be selected for processing, e.g., in different iterations, for different processors or processor cores, partially or fully sequentially, etc. In some implementations, all of the voxels of the grid that are intersected by the surface can be selected in block 802. This may be impractical in some implementations due to memory and processing power requirements of processing a large number of voxels. The method continues to block 804.

In block 804, initial approximate positions of vertices of the mesh are determined in the selected set of voxels. In some implementations, initial approximate positions of vertices of the mesh are determined on edges of the selected set of voxels. The approximate positions are determined based on voxel values of the input data that apply to the voxels in the selected set. For example, the approximate positions can be determined via the use of linear interpolation. In some examples, the values of adjacent voxels known from the input data can be obtained and linear interpolation applied between these adjacent values to find the approximate initial positions of the vertices of the mesh. In some implementations, the initial approximate positions of the vertices can be determined using other techniques. In some implementations, the vertices selected in the iterations of method 800 can be constrained to dimensions of each voxel space of each associated selected voxel of the set of voxels. The method continues to block 806.

In block 806, an approximate volume occupying each voxel of the selected set of voxels is determined based on the approximate positions of vertices determined in block 804. In some implementations, the determined approximate occupying volume for each voxel is an approximate occupancy value that can be compared to the input data if the input data is in the form of occupancy values. The input data may have specified a voxel value for each voxel that represents the occupying volume in the voxel. In some implementations, a 3D integral can be determined at each voxel for which the approximate volume is determined in block 804. The result of this integral is the volume of the mesh occupying (e.g., inside) the voxel, and thus is the current approximation of the volume occupancy of that voxel. The method continues to block 808.

In block 808, an error is determined between the approximate volumes of the selected set of voxels and corresponding voxel values of voxels of the input data. For example, each determined approximate volume can be compared to the corresponding voxel value of the input data and a difference between these values is determined to indicate the error for that voxel. An associated error can be determined for each voxel of the selected set of voxels. In some implementations, the input data can include occupancy values that can be compared directly to the determined approximate values. In some implementations, the input data can be converted to a format compatible with the determined approximate volumes so that the comparison can be made, e.g., based on a new voxel grid imposed on the input data in method 200, or other format. The method continues to block 810.

In block 810, it is determined whether the errors determined in block 808 for the set of selected voxels meet one or more predetermined criteria. For example, if a threshold amount of error has been predetermined for use with block 810, then it is determined whether the error of each voxel in the set is less than the threshold (or greater than the threshold, in other implementations). Other or additional criteria can also be used in various implementations. In some implementations, the number of iterations of blocks 806-812 that have been performed can be alternative or additional criteria for the determination of block 810. For example, if the number of iterations is above an iteration threshold (e.g., 3 iterations), then the predetermined criteria are met. If the predetermined criteria are met, then the method continues to block 814, described below.

If the predetermined criteria of block 810 are not met for the voxels in the set, then the process continues to block 812, in which one or more approximate positions of vertices in one or more of the selected voxels are adjusted (e.g., moved) to reduce the error according to a successive over-relaxation technique. In some examples, one vertex can be selected and moved, or multiple vertices can be selected and moved. For example, if the approximate volume is higher than the corresponding voxel value, one or more of the approximate vertices are moved inward toward the volume, and if the approximate volume is lower than the corresponding voxel value, one or more of the approximate vertices are moved outward away from the volume. In some implementations, the successive over-relaxation technique determines a voxel in which to move vertices, and the vertices that are moved can be selected based on a particular method, e.g., move one of the vertices, move all of the vertices, etc. In some implementations, the amount that these vertices are moved can be determined based on a tunable heuristic (e.g., based on desired characteristics of the mesh). For example, the selected vertices can be moved by the same amount, or selected vertices that have been moved in a previous iteration can be moved a lower amount than selected vertices that have not been moved, etc.

The success over-relaxation technique is an iterative technique that takes the form of a weighted average between the previous iterate and the computed Gauss-Seidel iterate (using the Gauss-Seidel technique) successively for each component, e.g., as follows:

$$x_i^{(k)} = \omega \bar{x}_i^{(k)} + (1-\omega) x_i^{(k-1)}$$

where $\bar{x}$ denotes a Gauss-Seidel iterate and w is the relaxation factor. A value can be chosen for the relaxation factor that accelerates the rate of convergence of the iterates to the solution (the actual position of the surface intersection).

In some implementations, a Gauss-Siedel technique can be used, which can be considered a successive over-relaxation technique with a relaxation factor of 1.

After one or more vertices have been moved, the method continues to block 806 in a next iteration to determine the approximate volume of the selected voxels based on the new approximate positions of the vertices determined in block 812, determines the error for the new approximate volume in block 808, and determines if the error meets the predetermined criteria in block 810. These iterations repeat, using the newly determined vertex positions in block 812 for each successive iteration, until the error meets the predetermined criteria in block 810, at which point the method continues to block 814. This method thus iteratively converges on vertex positions that are within the threshold error.

In some implementations, in succeeding iterations, one or more different vertices of the selected set of voxels can be moved instead of one or more of the vertices that were moved in previous iterations; and/or, one or more same vertices of the selected set of voxels can be moved in succeeding iterations. In some examples, one vertex is moved in one iteration of block 812, a different vertex adjacent to the moved vertex is moved in the next iteration of block 812, and so on. In other examples, multiple vertices are moved in one iteration, multiple other vertices are moved in the next iteration, and so on. In another example, multiple vertices are moved in one iteration, and one or more of those same vertices are moved in the next iteration. For example, a different vertex can be moved in each iteration, in any random or regular order. In another example, all the vertices of the selected set are moved in each iteration. The technique used to move vertices can depend, for example, on the form and/or content of the input data and which technique causes better (e.g., faster) convergence to the actual intersection point.

In block 814, the predetermined criteria of block 810 have been met, and the determined approximate positions of the vertices in the selected set of voxels are assigned to the generated mesh. The method continues to block 816.

In block 816, it is determined whether there are one or more other voxels of the voxel grid (outside of the selected set of voxels) for which to find mesh vertices. For example, one or more vertex positions on other edges of voxels through which the surface intersects may not yet be determined via method 800. In some implementations, one or more voxels adjacent to a voxel just processed can be selected, or a different voxel of the voxel grid can be selected. In some implementations, not all of the voxels through which the surface intersects are processed by method 800, e.g., based on predetermined thresholds or other criteria. If there are one or more other voxels to process, the method returns to block 802 to select another set of voxels to process. If no more voxels of the voxel grid are to be processed, the method continues to block 818.

In block 818, the method finalizes the mesh. For example, additional processing of the mesh can optionally be performed, e.g., further adjust mesh vertices using one or more additional techniques (e.g., method 900 of FIG. 9), store the mesh, display the mesh, etc.

In some implementations, parallel processing of mesh vertices and/or voxels can be performed, e.g., parallel processing of vertices and/or voxels in one or more blocks of method 800 for each voxel in the set of voxels being processed. In various implementations, one or more blocks of method 800 can be process vertices and/or voxels in sequence or substantially in parallel. For example, block 802 may be performed to select multiple sets of voxels, and blocks 804-816 may be performed substantially in parallel for each selected set of voxels. Parallel execution may improve the speed of determination of mesh (since multiple voxels/vertices may be subjected to calculation simultaneously). Further, parallel execution may better utilize processor resources, e.g., when the processor includes multiple processing cores (e.g., a GPU or a multi-core processor) and/or can support parallel execution of multiple threads.

Approximating a Surface by Subdivision of a Mesh

Figure 9:
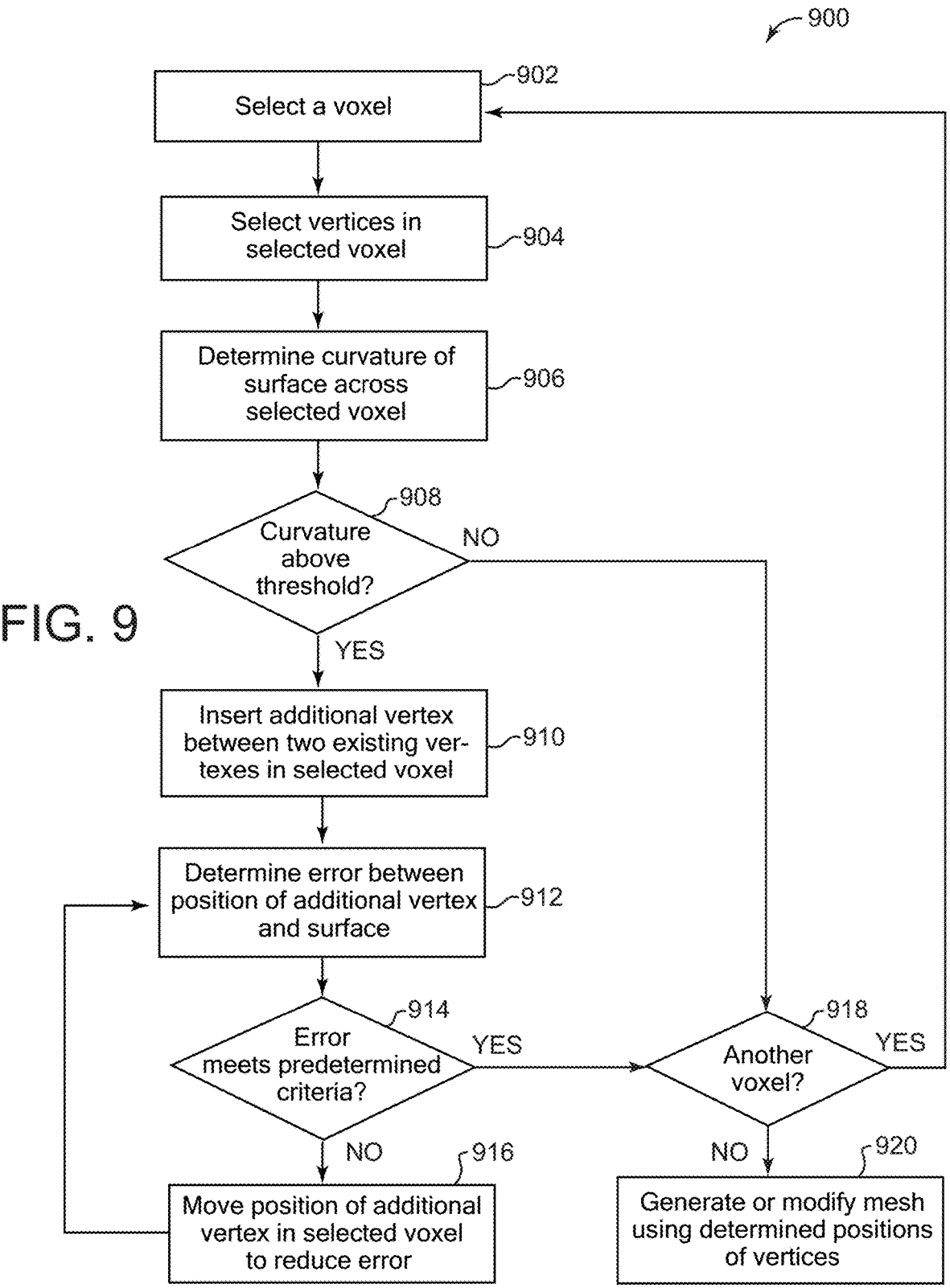
FIG. 9 is a flow diagram of an example method of determining the positions of vertices of a mesh that approximates a surface by subdividing one or more portions of the mesh, in accordance with some implementations.

FIG. 9 is a flow diagram illustrating an example method 900 of determining positions of vertices of a mesh that approximates a surface by subdividing one or more portions (e.g., lines) of the mesh, in accordance with some implementations. For example, method 900 can iteratively adjust (e.g., move) added vertices to be on or approximately on the surface. For example, method 900 can be an example implementation of determining vertex positions in block 210 of method 200 of FIG. 2 described above. In some implementations, method 900 can be a technique used in block 304 of method 300 of FIG. 3, or can be used independently or separately from method 300 of FIG. 3, to determine vertex positions in a mesh. In some implementations, method 900 can be implemented after, before, or in conjunction with one or more other techniques, e.g., any of methods 400, 600, or 800 described herein, or other known techniques (e.g., marching cubes, surface nets, or related techniques). In some implementations, method 900 can be performed, for example, on a server system and/or client system similarly as described for methods 200 and 300.

It should be noted that the terms "edge" or "edge of a voxel" are used in the description of method 900 for explanatory purposes. Similarly to the methods described above, in some implementations, a line segment can be an actual edge of a face of a cubical voxel, or in some implementations, e.g., in some mesh generation techniques such as some surface nets or similar techniques that can be used with method 900, a line segment can be a line that connects two adjacent voxel centers (or connects other portions of two adjacent voxels). In these latter implementations, such line segments can be used instead of edges of voxels, e.g., vertices in method 900 can be determined or selected along such line segments of voxels rather than along actual edges of voxels.

Method 900 can be used in some implementations in which the input data is provided as a distance field and/or represents a surface described by a surface function. In some implementations, the input data may be provided as occupancy values or density values.

Method 900 may begin at block 902. In block 902, a voxel is selected from the grid of voxels to be processed. The voxel is one of the voxels in the grid that is intersected by the surface, e.g., in block 206. The method continues to block 904.

In block 904, vertices in the selected voxel are selected. In some implementations, vertices on a face (or edges) of the selected voxel are selected, where the face (edges) is intersected by the surface. In some implementations, method 900 may be performed after a method has been performed to generate a mesh, such as method 400, 600, or 800 described herein, or other known technique, and approximated vertices of the mesh on the face of the voxel that were determined by such previous method(s) can be selected in block 904. In such implementations, the vertices may have approximate positions determined by the previous method. In some implementations, a surface function can be transformed from a 2D or 3D function into a linear function on an edge, e.g., similarly as described above with respect to block 404 of FIG. 4. The method continues to block 906.

In block 906, the curvature of the surface is determined (e.g., estimated) across the selected voxel, e.g., across edges of the selected voxel. In some implementations, if the surface function that defines the surface is known and is differentiable, the curvature can be estimated by determining surface tangents or normals at the selected vertices by a method such as finite differences. Characteristics of the tangent lines can be compared to determine an estimated curvature of the surface that is provided between these vertices. For example, if the two tangent lines at the vertices have approximately the same angle, the surface between the vertices does not likely curve significantly, while if the two tangent lines have greatly different angles, the surface between them likely curves significantly.

In some implementations, the curvature of the surface can be determined by evaluating the surface function (if the surface function is known). For example, the surface function can be sampled or evaluated at a midpoint of an edge of the intersected voxel face (or at a midpoint of a line connecting the selected vertices). The distance between the result of the function and the surface can be determined, and this distance can indicate the curvature of the surface (e.g., the larger the distance to the surface at the midpoint, the larger the curvature). In other implementations, other methods can be used that locally determine curvature of the approximated surface, e.g., at the selected vertices or otherwise across the intersected face of the selected voxel. The method continues to block 908.

In block 908, it is determined whether the curvature determined in block 906 is above a threshold. The curvature threshold can be selected, for example, to indicate a curvature that is large enough to not be approximated by a line within acceptable accuracy. In some examples, if two tangent lines are used to determine curvature as described above, the curvature threshold can be provided as a threshold difference in angle of the two tangent lines, such that if the angles of the tangent lines are greater than the threshold angle difference, the surface curvature is greater than the curvature threshold. Similarly, a curvature threshold can be provided as a threshold for an amount or distance between an evaluated midpoint and the surface, the midpoint located between the selected vertices as described above. If the curvature is less than (or otherwise does not meet) the threshold, the method continues to block 918, described below. If the curvature is greater than (or otherwise meets) the threshold, the method continues to block 910.

In block 910, an additional vertex is inserted between two existing vertices in the selected voxel, thus subdividing the line between the two existing vertices into a polyline. In some implementations, the two existing vertices can be the vertices selected in block 904. In some examples, the two existing vertices are provided on an edge of the selected voxel, and the additional vertex can be inserted at a midpoint between the two existing vertices, or at a different position with respect to the two vertices (e.g., closer to one of the existing vertices than the other of the existing vertices). Some implementations can place the additional vertex at a position between the existing vertices that is based on the curvature determined in block 906, e.g., if the curvature is determined to be skewed or biased toward one of the two existing vertices, the additional vertex can be positioned closer to that existing vertex.

In some implementations, the additional vertex is inserted between the two existing vertices in a line of an existing mesh (e.g., a side of a mesh polygon) that may have been generated in a previous iteration of method 900 or in a previous method, such as method 400, 600, 800, or other mesh generating technique. In some implementations, the additional vertex can be inserted between two existing vertices of one or more polygons of a template of polygons that is determined, for example, in block 208 of FIG. 2, where such a template can be referred to as a "mesh" for method 900. The method continues to block 912.

In block 912, an error is determined between the surface and the position of the additional vertex determined in block 910. For example, this error can be determined by evaluating the surface function with the value of the position of the additional vertex, and determining the difference between the function result and zero. A result of zero from such an evaluation of the surface function indicates that the position of the additional vertex is precisely on the surface. The method continues to block 914.

In block 914, it is determined whether the error meets one or more predetermined criteria. For example, if a threshold amount of error has been predetermined for use with block 914, then it is determined whether the error is less than the threshold (or greater than the threshold, in other implementations). Other or additional criteria can also be used in various implementations. In some implementations, the number of iterations of blocks 912-916 that have been performed can be alternative or additional criteria for the determination of block 914. For example, if the number of iterations is above an iteration threshold (e.g., 3 iterations), then the predetermined criteria are met. If the predetermined criteria are met, then the method continues to block 918, described below.

If the predetermined criteria are not met in block 914, then the method continues to block 916, in which the position of the additional vertex is adjusted (e.g., moved) such that the error determined in block 912 is reduced, e.g., the additional vertex is moved an amount that positions it closer to the actual surface. In some implementations, the new (moved) position of the additional vertex is determined by using a root-finding technique similarly as described above with reference to method 400 or 600, e.g., a root-finding technique that uses a differentiable function, a Bisection technique, etc. In some implementations, the additional vertex can be moved an amount based on the determined error, or a predetermined amount. In some implementations, a magnitude of error may indicate how close the position of the additional vertex is to the actual position, and the additional vertex can be moved based on (e.g., proportional to) the error to an estimated position that is closer to the actual position.

The method then continues to block 912 to start another iteration of adjusting the additional vertex, where the moved position from the previous iteration becomes the current position of the additional vertex. In the next iteration, the method determines and evaluates the error between the moved position of the additional vertex and moves the additional vertex as indicated by the predetermined criteria, similarly as described above, for multiple iterations if needed until the error meets the predetermined criteria of block 914.

In block 918, the predetermined criteria of block 914 have been met, and it is determined whether there is another voxel of the voxel grid to process with method 900. If there is another voxel to process, the method returns to block 902 to select another voxel to process. In some implementations, a voxel adjacent to the voxel just processed can be selected, or a different voxel of the voxel grid can be selected. In some implementations, not all of the voxels through which the surface intersects are processed by method 900, e.g., based on predetermined thresholds or other criteria.

In some implementations, the mesh can be further subdivided by adding one or more further additional vertices to the mesh on one or more polylines that have previously been subdivided by an additional vertex described above. The vertices selected and added in iterations of method 900 can be constrained to dimensions of a voxel space of the associated selected voxel. For example, similarly to block 906, the curvature of the surface can be determined between an original vertex of the voxel and a first additional vertex, and if this curvature is above the curvature threshold (or, in some implementations, above a different threshold used for additional vertices after the first additional vertex), similarly to block 908, the mesh line between that original vertex and the first additional vertex can be further subdivided by adding a second additional vertex to that mesh line. In some implementations, the position of this second additional vertex can be iteratively refined by being moved closer to the surface similarly as described above in block 916 for the first additional vertex, e.g., if an error between the second additional vertex and the surface is above an error threshold. In some implementations, third, fourth, and/or further additional vertices can be similarly added to the same mesh lines and iteratively refined in position. In some cases or implementations, such second (and later) additional vertices can be added to the mesh at positions of voxels that are not on faces or edges of the voxels, e.g., within the interior or other positions of a voxel.

If there are no more voxels of the voxel grid to process as determined in block 918, the method continues to block 920 to generate or modify the mesh. In some implementations, the positions of the additional vertices are assigned to the mesh, e.g., triangles or other polygons of the mesh are created or adjusted to incorporate the additional vertices added by method 900. For example, mesh lines can be drawn to the additional vertices. In some implementations, additional processing of the mesh can optionally be performed, e.g., further adjusting mesh vertex positions using one or more techniques, storing the mesh, displaying the mesh, etc.

While FIG. 9 illustrates a voxel-by-voxel determination of the mesh, it will be understood that one or more blocks of method 900 can be performed substantially in parallel. For example, block 902 may be performed to select multiple voxels, and blocks 904-918 may be performed substantially in parallel for each selected voxel. Parallel execution may improve the speed of determination of mesh (since multiple voxels/vertices may be subjected to calculation simultaneously). Further, parallel execution may better utilize processor resources, e.g., when the processor includes multiple processing cores (e.g., a GPU or a multi-core processor) and/or can support parallel execution of multiple threads.

Figure 10:
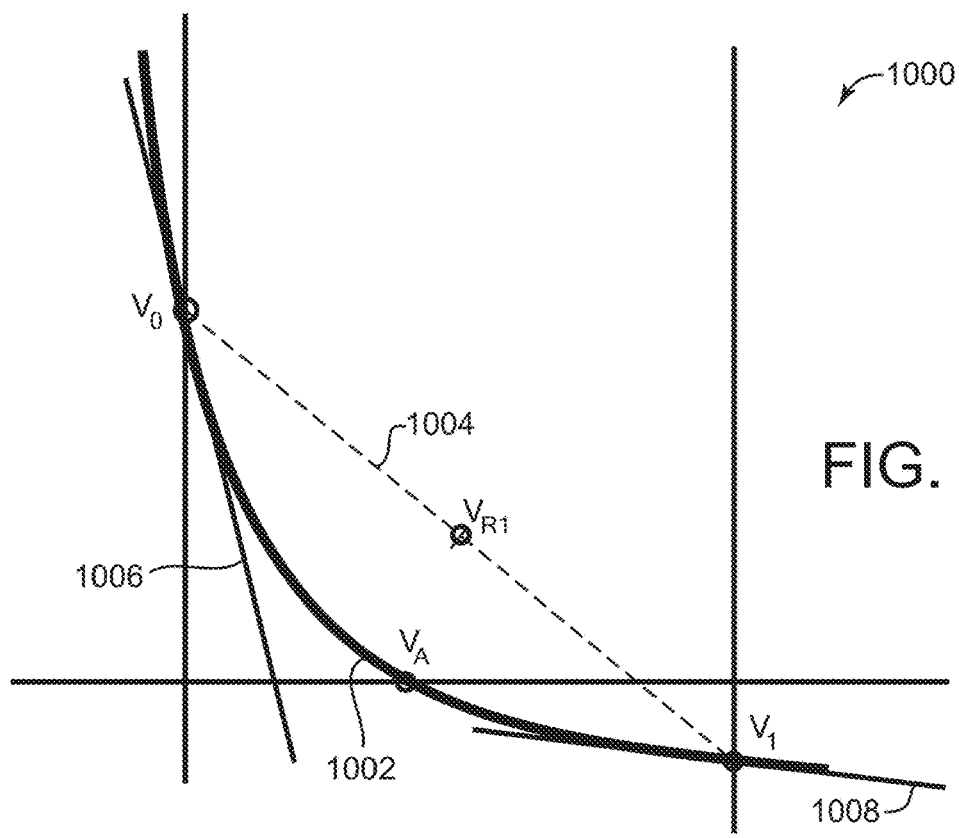
FIGS. 10-11 are diagrammatic illustrations of a graph showing an example of subdividing a portion of a mesh to add a vertex to the mesh and refine a position of the added vertex, in accordance with some implementations.
Figure 11:
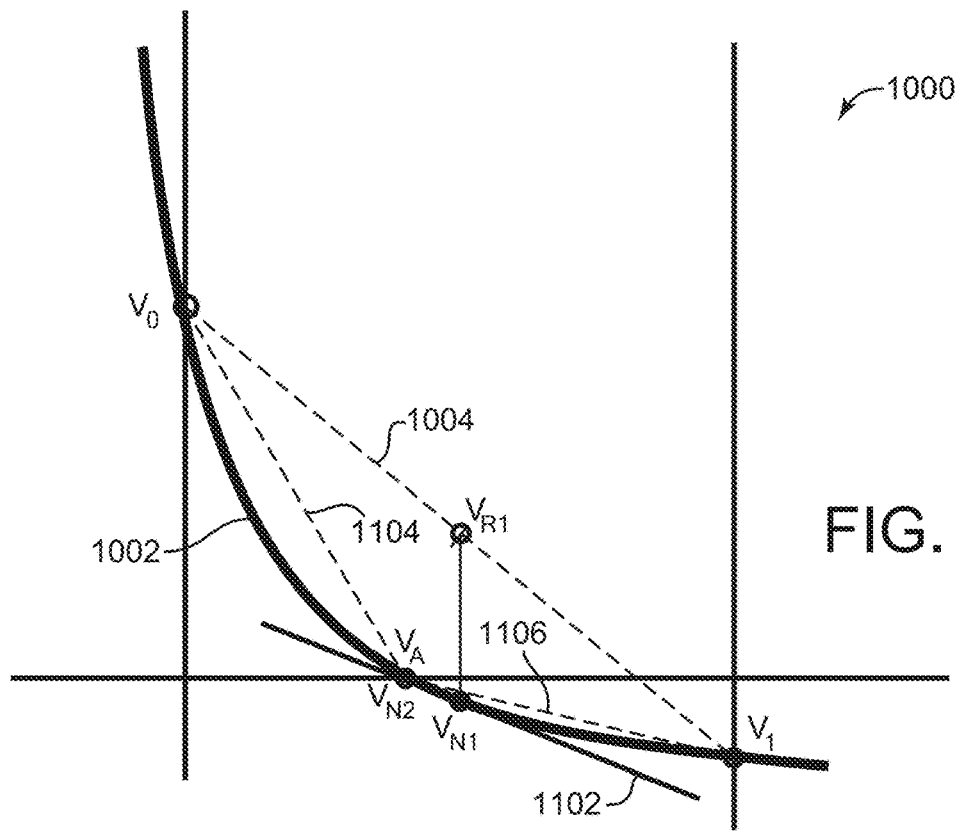

Graphs Showing Subdividing a Portion of Mesh to Add a Vertex and Refine the Position of the Added Vertex FIG. 10 is an illustration of a graph showing an example of subdividing a portion of a mesh to add a vertex and FIG. 11 is an illustration of a graph showing an example of refining a position of the added vertex, according to some implementations. In some implementations, the example of FIG. 10 is based on the method 900 of FIG. 9.

Graph 1000 illustrates a 2D example for simplicity. Graph 1000 shows a curve 1002 that represents the surface function over positions on an edge (and/or across a face) of a voxel between two vertices V0 and V1 on different (e.g., opposite) edges of the voxel, according to some implementations. The surface function has been transformed from a 2D or 3D function into a linear function on the edge similarly as described above with respect to block 904 or 404. The x-axis represents positions across an edge (or face) of the voxel. The y-axis represents the value of the surface function at those positions. Position $V_A$ is the actual position of intersection between the surface and the edge of the voxel, where the surface function is zero.

A line 1004 is provided between vertices V0 and V1 as an approximation of the surface path between these vertices. In some implementations, line 1004 can be part of a mesh that was generated previous to the method performed in the example of FIG. 10, or can be generated as part of the method of FIG. 10.

The curvature of the surface is determined at vertices V0 and V1. For example, a tangent line 1006 can be determined at vertex V0 and a tangent line 1008 can be determined at vertex V1. The angles of these tangent lines can be compared to determine a curvature. In this example, the difference in angles of tangent lines 1006 and 1008 is greater than a threshold angle, thus indicating a large degree of curvature of the surface between vertices V0 and V1.

In response to detecting the curvature above a curvature threshold, an additional vertex $V_{R1}$ is added to the line 1004 that connects vertices V0 and V1. In this example, vertex $V_{R1}$ is added at a mid-point halfway between V0 and V1. $V_{R1}$ can be added at different locations on line 1008 in other implementations.

FIG. 11 shows graph 1000 of FIG. 10 where the additional vertex $V_{R1}$ has been moved to a position closer to the surface. In this example, $V_{N1}$ is the actual function value (y-value) of the additional vertex $V_{R1}$. $V_{N1}$ is not on the surface since it is not at a zero (y=0) position. $V_{N1}$ is moved closer to the surface so that it is approximately on the surface. In this example, a root-finding technique is used, such as the Newton-Raphson root-finding technique (the surface function is differentiable). The root found by the root-finding technique is at vertex $V_{N2}$ based on the position where a tangent line 1102 at $V_{N1}$ intersects the horizontal axis. $V_{N2}$ is closer to the surface position at $V_A$ than $V_{N1}$.

If $V_{N2}$ is within a threshold distance of $V_A$, then no further iterations are performed in the root-finding method, and $V_{N2}$ is assigned to be a vertex of the mesh. This results in two mesh lines 1104 and 1106 to be used in place of line 1004, where mesh lines 1104 and 1106 approximate the surface curve 1002 more closely than line 1004.

In some implementations, additional iterations can be performed. For example, the curvature at vertices V0 and VN2 can be evaluated, and if the curvature is over the curvature threshold, the mesh line 1104 can be subdivided by a second additional vertex into a polyline having two lines. The second additional vertex need not be on the edge or face of the voxel (e.g., it can be within the voxel). In some implementations, the second additional vertex can be moved using a different technique, e.g., other than a root-finding technique.

The blocks in any of methods 400, 600, 800, or 900 can be performed (or repeated) in a different order than described above and/or one or more blocks can be omitted. These methods can be performed on a sever (e.g., 102 of FIG. 12) and/or a client device (e.g., 110 or 116 of FIG. 12).

Example System Architecture

FIG. 12 illustrates an example system architecture 1200, in accordance with some implementations of the disclosure.

The system architecture 1200 (also referred to as "system" herein) includes an online platform 1202, a first client device 1210 (generally referred to as "client devices 1210/116" herein), a network 1222, and a second client device 1216. The online platform 1202 can include, among other things, an application engine 1204, one or more applications 1205, a search engine 1206, and a data store 1208. The client device 1210 can include an application 1212. The client device 1216 can include an application 1218. Users 1214 and 1220 can use client devices 1210 and 1216, respectively, to interact with the online platform 1202.

System architecture 1200 is provided for illustration. In some implementations, the system architecture 1200 may include the same, fewer, more, or different elements configured in the same or different manner as that shown in FIG. 12.

In one implementation, network 1222 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 1208 may be a non-transitory computer readable memory (e.g., random access memory), a cache, a drive (e.g., a hard drive), a flash drive, a database system, or another type of component or device capable of storing data. The data store 1208 may also include multiple storage components (e.g., multiple drives or multiple databases) that may also span multiple computing devices (e.g., multiple server computers).

In some implementations, the online platform 1202 can include a server having one or more computing devices (e.g., a cloud computing system, a rackmount server, a server computer, cluster of physical servers, virtual server, etc.). In some implementations, a server may be included in the online platform 1202, be an independent system, or be part of another system or platform.

In some implementations, the online platform 1202 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online platform 1202 and to provide a user with access to online platform 1202. The online platform 1202 may also include a website (e.g., one or more webpages) or application back-end software that may be used to provide a user with access to content provided by online platform 1202. For example, users may access online platform 1202 using the application 1212/1218 on client devices 1210/1216, respectively.

In some implementations, online platform 1202 may be a type of social network providing connections between users or a type of user-generated content system that allows users (e.g., end-users or consumers) to communicate with other users via the online platform 1202, where the communication may include voice chat, video chat, or text chat. In some implementations of the disclosure, a "user" may be represented as a single individual. However, other implementations of the disclosure encompass a "user" (e.g., creating user) being an entity controlled by a set of users or an automated source.

In some implementations, online platform 1202 can generate meshes based on input data using one or more of the methods and features described herein. In some implementations, one or more client devices can generate meshes based on input data using one or more of the methods and features described herein.

In some implementations, online platform 1202 may be a virtual gaming platform. For example, the gaming platform may provide single-player or multiplayer games to a community of users that may access or interact with games (e.g., user generated games or other games) using client devices 1210/1216 via network 1222. In some implementations, games may be two-dimensional (2D) games, three-dimensional (3D) games (e.g., 3D user-generated games), virtual reality (VR) games, or augmented reality (AR) games, for example. Objects represented in the games can include objects defined by meshes that are generated from data as described herein. In some implementations, users may search for games and participate in gameplay with other users in one or more games selected from results of the search. In some implementations, a game selected from results of the search may be played in real-time with other users of the game. In some implementations, gameplay may refer to interaction of one or more players using client devices (e.g., 1210 and/or 1216) within a game (e.g., 1205) or the presentation of the interaction on a display or other output device of a client device 1210 or 1216.

In some implementation, online platform 1202 can be a social networking platform, purchasing platform, messaging platform, creation platform, platform providing digital content for viewing and manipulation by users (e.g., medical scans, terrain maps, etc.), and so on. Other collaboration platforms can be used with features described herein (e.g., using 3D or 2D digital objects defined by meshes for their surfaces or other characteristics) instead of or in addition to online platform 1202.

One or more applications 1205 are provided by the online platform. In some implementations, application 1205 can include an electronic file that can be executed or loaded using software, firmware or hardware configured to present content of the application (e.g., digital media item) to an entity. For example, application 1205 can be a game that present application content. In some implementations, an application 1212/1218 may be executed and an application 1205 rendered in connection with an application engine 1204.

It may be noted that 3D environments or 3D worlds use graphics that use a three-dimensional representation of geometric data representative of application content (or at least present content to appear as 3D content whether or not 3D representation of geometric data is used). 2D environments or 2D worlds use graphics that use two-dimensional representation of geometric data representative of application content.

In some implementations, the online platform 1202 can host one or more applications 1205 and can permit users to interact with the applications 1205 (e.g., search for applications, application content, or other content) using an application 1212/1218 of client devices 1210/1216. In some implementations, users (e.g., 1214 and/or 1220) of the online platform 1202 may play, create, search, interact with, or build applications and application content, e.g., games, videos, images, audio data, documents, etc., and communicate with other users, create and build application objects (e.g., also referred to as "item(s)" or "virtual item(s)" herein) of applications 1205, and/or search for objects. For example, in generating user-generated virtual game items, users may create characters, decoration for the characters, one or more virtual environments for an interactive game, or build structures used in a game application 1205, among others. In some implementations, online platform 1202 may transmit application content to applications (e.g., 1212). In some implementations, application objects may refer to objects that are used, created, shared or otherwise depicted in applications 1205 of the online platform 1202 or applications 1212 or 1218 of the client devices 1210/1216. For example, game objects may include a part, model, character, tools, weapons, clothing, buildings, vehicles, currency, flora, fauna, components of the aforementioned (e.g., windows of a building), and so forth.

It may be noted that the online platform 1202 may host one or more media items that can include communication messages from one user to one or more other users. Media items can include, but are not limited to, digital video, digital movies, digital photos, digital music, audio content, melodies, web site content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, an application 1205 may be associated with a particular user or a particular group of users (e.g., a private game), or made widely available to users of the online platform 1202 (e.g., a public game).

In some implementations, online platform 1202 or client devices 1210/1216 may include an application engine 1204 or application 1212/1218. The engine 1204 can include an application similar to application 1212/1218. In some implementations, engine 1204 may be used for the development or execution of applications 1205. For example, a game engine 1204 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the engine 1204 may generate commands that help compute and render the application (e.g., rendering commands, collision commands, physics commands, etc.). In some implementations, applications 1212/1218 of client devices 1210/1216, respectively, may work independently, in collaboration with engine 1204 of online platform 1202, or a combination of both.

In some implementations, both the online platform 1202 and client devices 1210/1216 execute an engine (1204, 1212, and 1218, respectively). In various implementations, each application 1205 may have a different ratio between the engine functions that are performed on the online platform 1202 and the engine functions that are performed on the client devices 1210 and 1216.

In some implementations, a component of a digital object, such as a body part, may be a primitive geometrical shape such as a block, a cylinder, a sphere, etc., or some other primitive shape such as a wedge, a torus, a tube, a channel, etc. In some implementations, a creator module may publish an object (e.g., game character) for view or use by other users of the online platform 1202. In some implementations, creating, modifying, or customizing objects, applications 1205, or application environments may be performed by a user using a user interface (e.g., developer interface) and with or without scripting (or with or without an application programming interface (API)).

In some implementations, the online platform 1202 may store digital objects and content created by users in the data store 1208.

In some implementations, the client device(s) 1210 or 1216 may each include computing devices such as personal computers (PCs), mobile devices (e.g., laptops, mobile phones, smart phones, tablet computers, or netbook computers), network-connected televisions, gaming consoles, etc. In some implementations, a client device 1210 or 1216 may also be referred to as a "user device." The number of client devices 1210 or 1216 is provided as illustration, rather than limitation. In some implementations, any number of client devices 1210 or 1216 may be used.

In some implementations, each client device 1210 or 1216 may include an instance of the application 1212 or 1218, respectively. In one implementation, the application 1212 or 1218 may permit users to use and interact with online platform 1202, such as search for an application or application content, control an object in a virtual game hosted by online platform 1202, or view or upload content, such as games, images, video items, web pages, documents, and so forth. In one example, the application may be a web application (e.g., an application that operates in conjunction with a web browser) that can access, retrieve, present, or navigate content served by a web server. In another example, the application may be a native application (e.g., a mobile application, app, or a gaming program) that is installed and executes local to client device 1210 or 1216 and allows users to interact with online platform 1202. The application may render, display, or present the content (e.g., a web page, a media viewer) to a user. In an implementation, the application may also include an embedded media player (e.g., a Flash® player) that is embedded in a web page.

In general, functions described in one implementation as being performed by the online platform 1202 can also be performed by the client device(s) 1210 or 1216, or a server, in other implementations if appropriate. In addition, the functionality attributed to a particular component can be performed by different or multiple components operating together. The online platform 1202 can also be accessed as a service provided to other systems or devices through appropriate application programming interfaces (APIs), and thus is not limited to use in websites.

Example Computing Device

FIG. 13 is a block diagram of an example computing device 1300 which may be used to implement one or more features described herein, in accordance with some implementations. In one example, device 1300 may be used to implement a computer device (e.g., 1202, 1210, and/or 1216 of FIG. 12), and perform method implementations described herein. Computing device 1300 can be any suitable computer system, server, or other electronic or hardware device. For example, the computing device 1300 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1300 includes a processor 1302, a memory 1304, input/output (I/O) interface 1306, and audio/video input/output devices 1314 (e.g., display screen, touchscreen, display goggles or glasses, audio speakers, microphone, etc.).

Processor 1302 can be one or more processors and/or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1304 is typically provided in device 1300 for access by the processor 1302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1304 can store software operating on the server device 1300 by the processor 1302, including an operating system 1308, a mesh generation engine application 1310 and associated data 1312. In some implementations, the mesh generation engine application 1310 can include instructions that enable processor 1302 to perform the functions described herein, e.g., some or all of the methods of FIGS. 2-4, 6, 8, and 9. In various implementations, some or all of the methods of FIGS. 2-4, 6, 8, and 9 can be implemented on one or more devices 1300, e.g., on one or more processors of each of the one or more devices 1300.

For example, memory 1304 can include software instructions for a mesh generation engine 1310 that can generate meshes from input data and provide the meshes for use by device 1300 and/or an online platform (e.g., 1202), e.g., storing, modifying, and/or rendering the meshes for display by a display device of I/O devices 1314. Any of software in memory 1304 can alternatively be stored on any other suitable storage location or computer-readable medium. In addition, memory 1304 (and/or other connected storage device(s)) can store instructions and data used in the features described herein. Memory 1304 and any other type of storage (magnetic disk, optical disk, magnetic tape, or other tangible media) can be considered "storage" or "storage devices."

I/O interface 1306 can provide functions to enable interfacing the server device 1300 with other systems and devices. For example, network communication devices, storage devices (e.g., memory and/or data store 1208), and input/output devices can communicate via interface 1306. In some implementations, the I/O interface can connect to interface devices including input devices (keyboard, pointing device, touchscreen, microphone, camera, scanner, etc.) and/or output devices (display device, speaker devices, printer, motor, etc.). For example, meshes generated by the online platform 1202 (and/or digital objects and digital features derived therefrom) can be stored at the platform 1202 and also sent over a network to one or more client devices for storage and display by the client devices.

For ease of illustration, FIG. 13 shows one block for each of processor 1302, memory 1304, I/O interface 1306, software blocks 1308 and 1310, and database 1312. These blocks may represent one or more processors or processing circuitries, operating systems, memories, I/O interfaces, applications, and/or software modules. In other implementations, device 1300 may not have all of the components shown and/or may have other elements including other types of elements instead of, or in addition to, those shown herein. While the online platform 1202 is described as performing operations as described in some implementations herein, any suitable component or combination of components of online gaming platform 1202 or similar system, or any suitable processor or processors associated with such a system, may perform the operations described.

A user device can also implement and/or be used with features described herein. Example user devices can be computer devices including some similar components as the device 1300, e.g., processor(s) 1302, memory 1304, and I/O interface 1306. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 1314, for example, can be connected to (or included in) the device 1300 to display images pre- and post-processing as described herein, where such display device can include any suitable display device, e.g., an LCD, LED, or plasma display screen, CRT, television, monitor, touchscreen, 3-D display screen, AR/VR display, projector, or other visual display device. Some implementations can provide an audio output device, e.g., voice output or synthesis that speaks text. For example, such display devices or output devices can display objects (including one or more surfaces or other characteristics/features) in a virtual environment that are based on meshes generated by mesh generation engine 1310.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 200, 300, 400, 600, 800, and/or 900) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
    receiving, by one or more processors, input data that represents a surface that distinguishes an inside and an outside of a volume;
    determining, by the one or more processors, a voxel grid that includes the surface, wherein the voxel grid includes a plurality of voxels;
    identifying, by the one or more processors, particular voxels of the plurality of voxels which the surface intersects; and
    generating, by the one or more processors, a mesh that approximates the surface, the mesh including a plurality of polygons that are defined by vertices of the mesh in the particular voxels, wherein generating the mesh includes:
        determining approximate positions of a subset of the vertices of the polygons of the mesh in a subset of the particular voxels, based on interpolation of locations in the subset of the particular voxels where the surface intersects the subset of the particular voxels;
        determining errors between approximate voxel values and assigned voxel values of the particular voxels, wherein the approximate voxel values are based on the approximate positions and the assigned voxel values are determined from the input data; and
        adjusting the approximate position of at least one vertex of the subset of the vertices using a successive over-relaxation technique to reduce the errors.

2. The computer-implemented method of claim 1, wherein adjusting the approximate position of the at least one vertex includes iterating, using the one or more processors, the determining the errors and the adjusting until the errors meet predetermined criteria.

3. The computer-implemented method of claim 2, wherein the errors meet predetermined criteria in response to a predetermined number of iterations being performed or in response to the errors meeting one or more predetermined thresholds.

4. The computer-implemented method of claim 1, wherein the approximate positions of the subset of the vertices of the polygons are determined based on interpolation of locations on edges of the subset of the particular voxels where the surface intersects the edges.

5. The computer-implemented method of claim 1, further comprising, mapping, by the one or more processors, each voxel of the plurality of voxels to a respective intersection case from a set of stored intersection cases based on the input data, wherein each mapped intersection case indicates an intersection path of the surface through the voxel, wherein identifying the particular voxels includes identifying edges or other line segments of the particular voxels which the surface intersects based on the mapped intersection cases.

6. The computer-implemented method of claim 1, wherein determining the approximate positions of the subset of the vertices of the polygons of the mesh includes determining initial approximate positions of the vertices using a marching cubes technique or a surface nets technique.

7. The computer-implemented method of claim 1, wherein the successive over-relaxation technique is used to determine a plurality of approximate positions of the subset of vertices of the polygons, and wherein the subset of the particular voxels includes a plurality of adjacent voxels of the mesh.

8. The computer-implemented method of claim 1, wherein the subset of the particular voxels include a plurality of adjacent voxels of the voxel grid, and further comprising determining approximate positions of a second subset of vertices of the polygons of the mesh in a second subset of adjacent voxels of the particular voxels.

9. The computer-implemented method of claim 1, wherein determining the errors includes:
    determining the approximate voxel values based on the approximate positions; and
    comparing the approximate voxel values with the assigned voxel values,
    wherein determining the approximate voxel values includes, for each approximate voxel value:

determining a volume of the mesh that intersects the voxel associated with the approximate voxel value; and determining the approximate voxel value based on the volume of the mesh.

10. The computer-implemented method of claim 9, wherein determining the volume of the mesh that intersects the voxel associated with the approximate voxel value includes determining a 3-dimensional integral of the mesh within the voxel associated with the approximated voxel value.

11. The computer-implemented method of claim 1, further comprising generating a feature surface based on the mesh, the feature surface displayable by a display device.

12. The computer-implemented method of claim 1, wherein the input data includes scalar values that indicate a density or occupancy of voxels by the volume.

13. A system comprising:
at least one processor; and
a memory coupled to the at least one processor, with instructions stored thereon that, when executed by the at least one processor, cause the at least one processor to perform operations comprising:
receiving input data that represents a surface that distinguishes an inside and an outside of a volume;
determining a voxel grid that includes the surface, wherein the voxel grid includes a plurality of voxels;
identifying particular voxels of the plurality of voxels which the surface intersects; and
generating a mesh that approximates the surface, the mesh including a plurality of polygons that are defined by vertices of the mesh in the particular voxels, wherein generating the mesh includes:
determining approximate positions of a subset of the vertices of the polygons of the mesh in a subset of the particular voxels, based on interpolation of locations in the subset of the particular voxels where the surface intersects the subset of the particular voxels;
determining errors between approximate voxel values and assigned voxel values of the particular voxels, wherein the approximate voxel values are based on the approximate positions and the assigned voxel values are determined from the input data; and
adjusting the approximate position of at least one vertex of the subset of the vertices using a successive over-relaxation technique to reduce the errors.

14. The system of claim 13, wherein the operation of adjusting the approximate position of the at least one vertex includes iterating the determining the errors and the adjusting until the errors meet predetermined criteria.

15. The system of claim 13, wherein the successive over-relaxation technique is used to determine a plurality of approximate positions of the subset of vertices of the polygons, and wherein the subset of the particular voxels includes a plurality of adjacent voxels of the mesh.

16. The system of claim 13, wherein the subset of the particular voxels include a plurality of adjacent voxels of the voxel grid, and the at least one processor performs further operations comprising determining approximate positions of a second subset of vertices of the polygons of the mesh in a second subset of adjacent voxels of the particular voxels.

17. The system of claim 13, wherein the operation of determining the errors includes:
determining the approximate voxel values based on the approximate positions; and
comparing the approximate voxel values with the assigned voxel values,
wherein determining the approximate voxel values includes, for each approximate voxel value:
determining a volume of the mesh that intersects the voxel associated with the approximate voxel value; and
determining the approximate voxel value based on the volume of the mesh.

18. The system of claim 17, wherein the operation of determining the volume of the mesh that intersects the voxel associated with the approximate voxel value includes determining a 3-dimensional integral of the mesh within the voxel associated with the approximated voxel value.

19. The system of claim 13, wherein the at least one processor performs further operations comprising generating a feature surface based on the mesh, the feature surface displayable by a display device.

20. A non-transitory computer readable medium has stored thereon software instructions that, when executed by a processor of a device, cause the processor to perform operations comprising:
receiving input data that represents a surface that distinguishes an inside and an outside of a volume;
determining a voxel grid that includes the surface, wherein the voxel grid includes a plurality of voxels;
identifying particular voxels of the plurality of voxels which the surface intersects; and
generating a mesh that approximates the surface, the mesh including a plurality of polygons that are defined by vertices of the mesh in the particular voxels, wherein generating the mesh includes:
determining approximate positions of a subset of the vertices of the polygons of the mesh in a subset of the particular voxels, based on interpolation of locations in the subset of the particular voxels where the surface intersects the subset of the particular voxels;
determining errors between approximate voxel values and assigned voxel values of the particular voxels, wherein the approximate voxel values are based on the approximate positions and the assigned voxel values are determined from the input data; and
adjusting the approximate position of at least one vertex of the subset of the vertices using a successive over-relaxation technique to reduce the errors.

* * * * *